(12) United States Patent
Hirayama et al.

(10) Patent No.: US 10,353,237 B2
(45) Date of Patent: Jul. 16, 2019

(54) ENHANCING LUMINANCE IN DISPLAY DEVICES USING LIGHTING GUIDE PLATES

(71) Applicant: Sharp Kabushiki Kaisha, Sakai, Osaka (JP)

(72) Inventors: Yoshinobu Hirayama, Sakai (JP); Takao Imaoku, Sakai (JP); Shugo Yagi, Yonago (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 21 days.

(21) Appl. No.: 15/533,954

(22) PCT Filed: Dec. 3, 2015

(86) PCT No.: PCT/JP2015/083958
§ 371 (c)(1),
(2) Date: Jun. 7, 2017

(87) PCT Pub. No.: WO2016/093136
PCT Pub. Date: Jun. 16, 2016

(65) Prior Publication Data
US 2017/0363909 A1  Dec. 21, 2017

(30) Foreign Application Priority Data
Dec. 10, 2014  (JP) .................. 2014-249782

(51) Int. Cl.
*G02F 1/1335* (2006.01)
*F21V 8/00* (2006.01)
(52) U.S. Cl.
CPC ..... *G02F 1/133524* (2013.01); *G02B 6/0036* (2013.01); *G02B 6/0038* (2013.01);
(Continued)

(58) Field of Classification Search
CPC ......... G02F 1/133615; G02F 1/133606; G02F 2001/133607; G02B 6/0036; G02B 6/0038; G02B 6/0046; G02B 6/0048
See application file for complete search history.

(56) References Cited

U.S. PATENT DOCUMENTS

2004/0264911 A1  12/2004  Toeda et al.
2008/0025687 A1   1/2008  Lee et al.
(Continued)

FOREIGN PATENT DOCUMENTS

JP    2005-071610 A    3/2005
JP    2008-016430 A    1/2008

*Primary Examiner* — Paisley L Arendt
(74) *Attorney, Agent, or Firm* — ScienBiziP, P.C.

(57) ABSTRACT

A lighting device includes LEDs 17, and a light guide plate 19 including an edge surface and a pair of plate surfaces, a part of the edge surface being a light entrance surface 19B through which light from the LEDs 17 enters, and one of the plate surfaces being a light exit surface 19A through which the light exits and another one of the plate surfaces being an opposite plate surface 19C opposite from the light exit surface 19A. The light guide plate 19 includes prism portions 51 on the opposite plate surface 19C, projecting from the opposite plate surface 19C and arranged in the X-axis direction and configured to collect light toward in a normal direction of the light exit surface 19A, and an exit light reflection portion 60 provided in a recessed portion 52 that is formed by two adjacent prism portions 51 and configured to reflect light travelling within the light guide plate 19 and facilitate exiting of light from the light guide plate 19.

9 Claims, 22 Drawing Sheets

(52) U.S. Cl.
CPC ......... *G02B 6/0048* (2013.01); *G02B 6/0055* (2013.01); *G02F 1/133615* (2013.01); *G02B 6/0035* (2013.01); *G02B 6/0046* (2013.01); *G02F 1/133603* (2013.01); *G02F 2001/133607* (2013.01)

(56) References Cited

U.S. PATENT DOCUMENTS

2009/0323372 A1\* 12/2009 Kurihara ................ G02B 6/002
 362/620
2014/0340930 A1\* 11/2014 Nakagome ........... G02B 6/0036
 362/607

\* cited by examiner

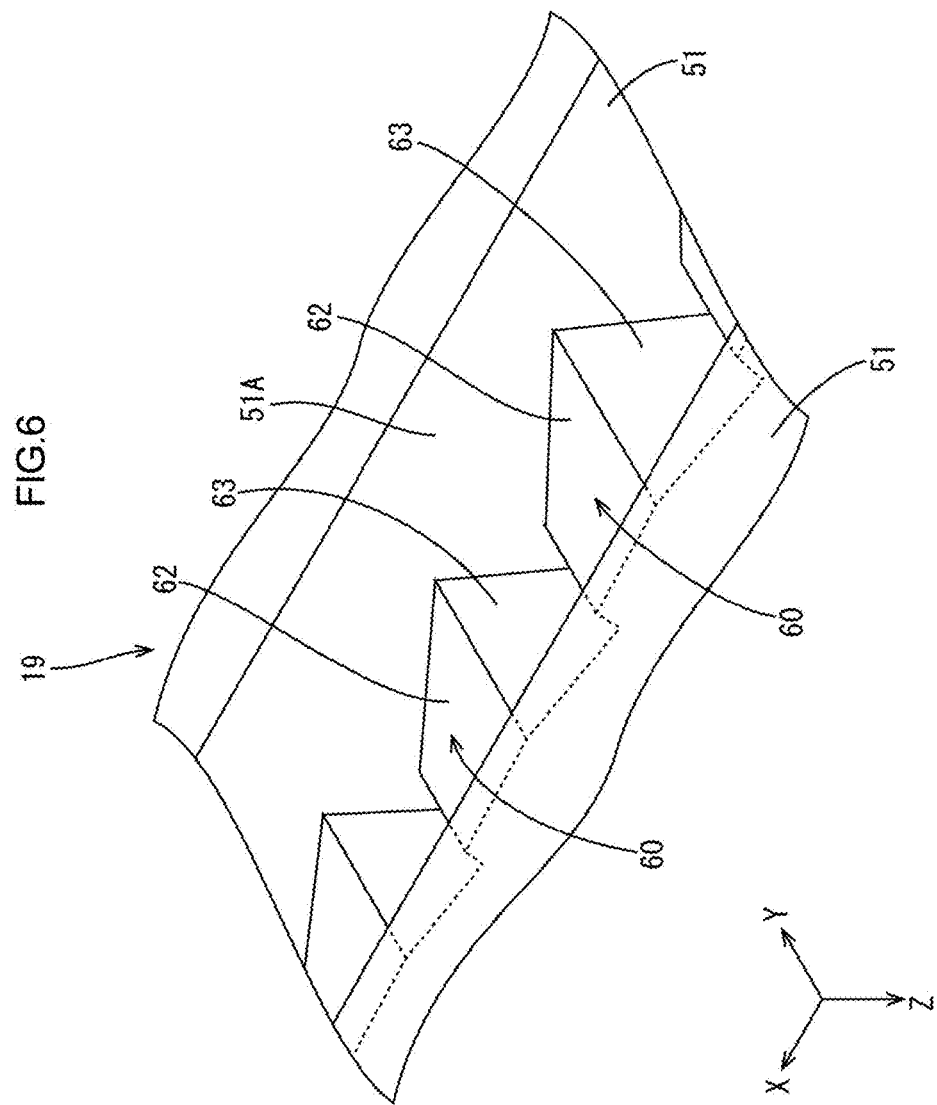

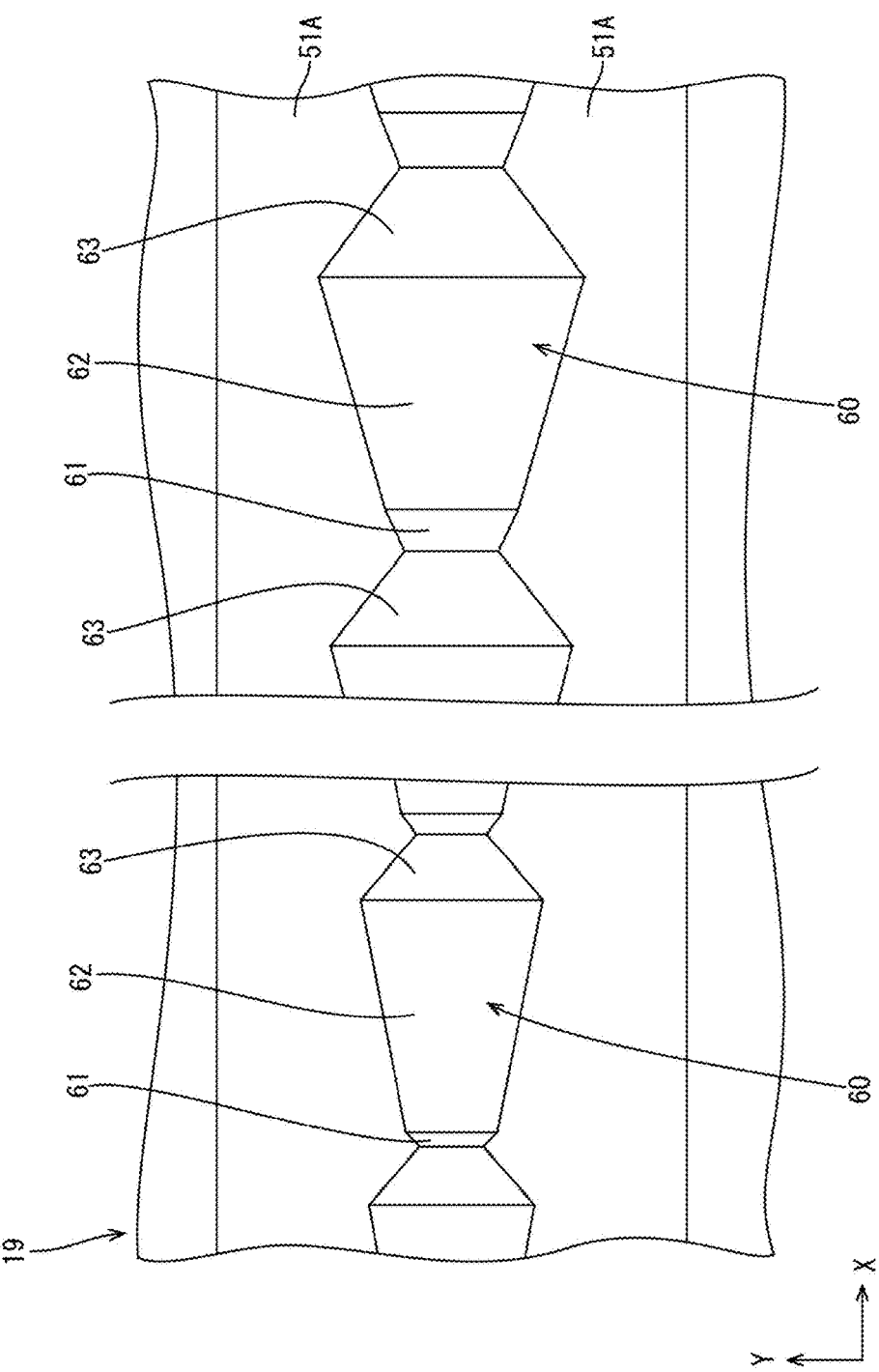

FIG.8

| | | COMPARATIVE EXMPLE 1 | COMPARATIVE EXMPLE 2 | FIRST EMBODIMENT |
|---|---|---|---|---|
| SPEC | SHAPE OF LENS PORTION | CYLINDER | CYLINDER | CYLINDER |
| | APEX ANGLE OF PRISM PORTION 51 | 140° | 140° | 140° |
| | POSITION OF EXIT LIGHT REFLECTION PORTION | APEX PORTION | APEX PORTION | RECESSED PORTION |
| | LIGHT ENTRANCE PRISM | NO (FLAT SURFACE) | YES (APEX ANGLE OF 110 DEGREES) | NO (FLAT SURFACE) |
| INDEX | VISUAL JUDGEMENT OF UNEVENNESS | NG | OK | OK |
| | AVERAGE Cm VALUE | 0.112 | 0.077 | 0.074 |
| | AVERAGE LUMINANCE (RELATIVE RATIO) | 1336 (100) | 1206 (90.3) | 1354 (101.3) |

FIG.20

| | APEX ANGLE OF PRISM PORTION 355 (°) | APEX ANGLE OF PRISM PORTION 51 (°) | RELATIVE LUMINANCE (%) |
|---|---|---|---|
| FIRST EMBODIMENT | CYLINDER | 140 | 100.0 |
| THIRD EMBODIMENT 1 | 150 | 100 | 107.7 |
| 2 | 150 | 150 | 107.0 |
| 3 | 140 | 140 | 106.9 |
| 4 | 110 | 130 | 105.8 |
| 5 | 130 | 100 | 105.3 |
| 6 | 140 | 100 | 104.7 |
| 7 | 130 | 140 | 104.8 |
| 8 | 120 | 140 | 104.3 |
| 9 | 110 | 140 | 103.5 |

ENHANCING LUMINANCE IN DISPLAY DEVICES USING LIGHTING GUIDE PLATES

TECHNICAL FIELD

The present invention relates to a lighting device and a display device.

BACKGROUND ART

An example of a lighting device included in a display device is disclosed in Patent Document 1. The lighting device disclosed in Patent Document 1 includes point light sources and a light guide plate. Light emitted by the point light sources enters the light guide plate and travels within the light guide plate. The light guide plate has a lighting surface on a plate surface opposite from the light exit surface. Light is reflected by the lighting surface toward the light exit surface. The light reflected by the lighting surface exits through the light exit surface.

RELATED ART DOCUMENT

Patent Document

Patent Document 1: Japanese Unexamined Patent Application. Publication. No. 2005-071610

Problem to be Solved by the Invention

In the configuration including the above-described light guide plate, the light exiting the light guide plate through the light exit surface is required to have even luminance over an entire area of the light exit surface. There has been room for improvement in the requirement.

DISCLOSURE OF THE PRESENT INVENTION

An object of the present invention is to achieve less occurrence of luminance unevenness.

Means for Solving the Problem

To solve the above problem, a lighting device includes light sources, and a light guide plate including an edge surface and a pair of plate surfaces, a part of the edge surface being a light entrance surface through which light from the light sources enters, and one of the pair of plate surfaces being a light exit surface through which the light exits and another one of the pair of plate surfaces being an opposite plate surface opposite from the light exit surface. The light guide plate includes light collecting portions on one of the light exit surface and the opposite plate surface, projecting from the one of the light exit surface and the opposite plate surface and arranged in a predetermined direction and configured to collect light toward in a normal direction of the light exit surface, and an exit light reflection portion provided in a recessed portion that is formed by two adjacent light collecting portions and configured to reflect light travelling within the light guide plate and facilitate exiting of light from the light guide plate.

According to the present invention, light emitted by the light sources enters the light guide plate through the light entrance surface and travels within the light guide plate. A part of the rays of light travelling within the light guide reaches the exit light reflection portions and a part of the rays of light reaching the exit light reflection portions is reflected by the exit light reflection portions and exits the light guide plate. A part of the rays of light travelling within the light guide reaches the light collecting portions and a part of the rays of light reaching the light collecting portions is collected toward the direction of the normal line of the light exit surface. Accordingly, the front luminance of light exiting the light guide plate is further increased. If the exit light reflection portions are included in the apex portions of the light collecting portions, the light reflected by the exit light reflection portions (that is likely to exit the light guide plate) is likely to be collected by the light collecting portions. Therefore, among the rays of light exiting through the light exit surface, light exiting the portions overlapping the exit light reflection portions have luminance higher than surrounding portions thereof and luminance unevenness is caused. According to the present invention, the exit light reflection portions are provided in the recessed portion formed by the two adjacent light collecting portions. Therefore, compared to the configuration including the exit light reflection portions in the apex portions of the light collecting portions, light reflected by the exit light reflection portions is less likely to be collected by the light collecting portions. As a result, the luminance of the portions overlapping the exit light reflection portions is less likely to be higher than the surrounding portions thereof and the luminance unevenness is less likely to be caused.

The exit light reflection portion may include exit light reflection portions that are arranged in a normal line of the light entrance surface, and the exit light reflection portions may have inclined surfaces inclined toward the plate surface without having the exit light reflection portion thereon as is farther away from the light sources, and the inclined surfaces may have a greater area as is farther away from the light sources.

According to such a configuration, a greater amount of rays of light exits the light guide plate as the inclined surfaces are farther away from the light sources. Generally, the amount of exit light is reduced as a portion of the light guide plate is farther away from the light sources. According to the configuration where each area of the inclined surfaces is set as described above, luminance unevenness is less likely to occur in the light exiting through the portion of the light exit surface closer to the light sources and the portion thereof farther away from the light sources.

The light collection portions may be prism portions that extend in a direction perpendicular to an arrangement direction in which the light collection portions are arranged, and the two adjacent light collection portions may have ridge lines each of which extends in an arrangement direction in which the exit light reflection portions are arranged, and the exit light reflection portions may be formed such that a distance between the exit light reflection portions and the ridge lines with respect to a plate thickness direction of the light guide plate is decreased as is farther away from the light sources.

The exit light reflection portions are formed in the recessed portion between the adjacent two prism portions, and the exit light reflection portions are formed to connect the surface of one of the two adjacent prism portions and the surface of the other one. The distance between the surface of the one of the two adjacent prism portions and the surface of the other one of the two adjacent prism portions is increased as is closer to the ridge line of the prism portion. Therefore, each of the inclined surfaces included in the exit light reflection portion increases in a length thereof with respect to a direction perpendicular to the ridge line and increases in an area thereof as is closer to the ridge line of the prism portion. As is in the present invention, the distance between the exit light reflection portion and the ridge line with respect to the plate thickness direction of the light guide plate is decreased as is farther away from the light sources. Therefore, the inclined surface is closer to the ridge line as is farther away from the light sources and the area of the inclined surfaces is increased.

The lighting device may further include a light reflecting member arranged to cover the opposite plate surface and configured to reflect light toward the opposite plate surface. The light guide plate may include the light collection portions and the exit light reflection portions on the light exit surface, and the light guide plate may include a light dispersing portion on the opposite plate surface, the light dispersing portion dispersing light.

According to such a configuration, a part of the rays of light travelling within the light guide plate and reaching the exit light reflection portion is reflected toward the opposite plate surface and exits the light guide plate through the opposite plate surface. Then, the light is reflected by the light reflecting member toward the opposite plate surface. The light reflected by the light reflecting member enters the light guide plate through the opposite plate surface and exits through the light exit surface. The light dispersing portion for dispersing light is provided on the opposite plate surface. According to the configuration, during the process that the light exiting through the opposite plate surface is reflected by the light reflecting member and enters the light guide plate through the opposite plate surface, the light passes through the light dispersing portion twice. If the exit light reflection portion is formed on the opposite plate surface and the light dispersing portion is formed on the light exit surface, the light reflected by the exit light reflection portion travels toward the light exit surface and passes through the light dispersing portion only once and exits the light guide plate. Compared to such a configuration, in the present invention, the light passes through the light dispersing portion increased number of times and the light is surely dispersed and luminance unevenness is further less likely to be caused.

The light guide plate may have a rectangular shape and the light entrance surface may have an elongated shape extending in one side direction of the light guide plate, and the light sources may be arranged in a longitudinal direction of the light entrance surface, and the light collecting portions may be configured to collect light with respect to an arrangement direction in which the light sources are arranged. According to such a configuration, luminance unevenness is less likely to be caused in the arrangement direction of the light sources.

Next, to solve the above problem, a display device includes the above lighting device and a display panel displaying images using light from the lighting device. According to the display device having such a configuration, luminance unevenness is less likely to be caused and display quality is improved.

The display panel may be a liquid crystal panel including a pair of substrates and liquid crystals enclosed between the substrates. Such a display device may be used as a liquid crystal display device of a display of smartphones or tablet computers.

Advantageous Effect of the Invention

According to the present invention, uneven luminance is less likely to be caused.

BRIEF DESCRIPTION OF THE DRAWINGS

FIG. 6 is a perspective view of exit light reflection portions of the light guide plate seen from an opposite plate surface side.

FIG. 7 is a view of the exit light reflection portions of the light guide plate seen from the opposite plate surface side.

FIG. 8 is a table illustrating configurations of Comparative Examples 1 and 2 and the first embodiment.

FIG. 20 is a table illustrating correlation of an apex angle of prism portions and luminance in the third embodiment.

MODES FOR CARRYING OUT THE INVENTION

First Embodiment

Figure 1:
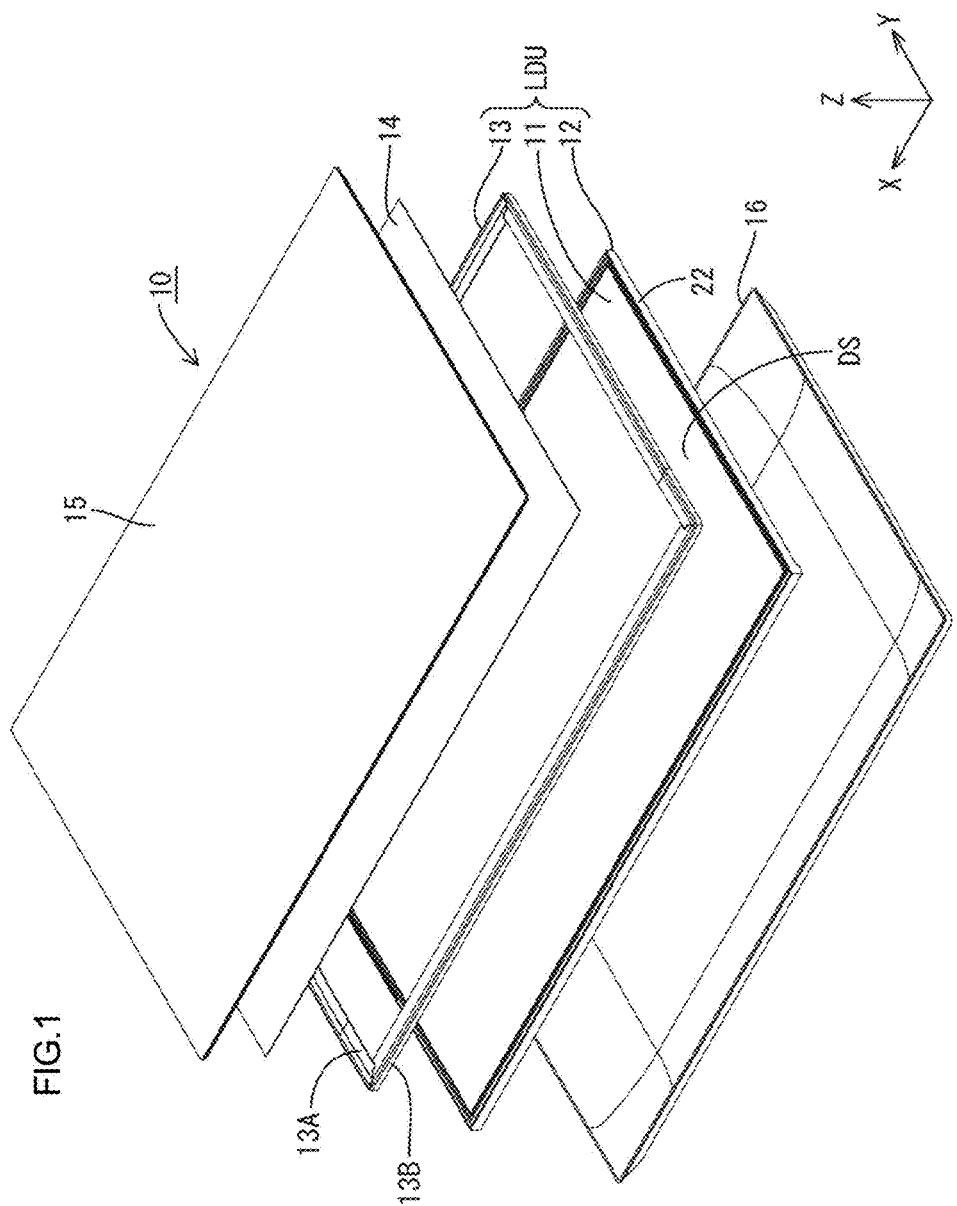
FIG. 1 is an exploded perspective view illustrating a general configuration of a liquid crystal display device according to a first embodiment of the present invention.

A first embodiment of the present invention will be described with reference to FIGS. 1 to 16. In the present embodiment, a liquid crystal display device 10 will be described as an example. X-axis, the Y-axis and the Z-axis may be present in the drawings and each of the axial directions represents a direction represented in each drawing. An up-down direction is referred to FIG. 3 and an upper side and a lower side in the drawings correspond to a front side and a back side, respectively.

As illustrated in FIG. 1, the liquid crystal display device 10 has a rectangular plan-view shape as a whole, and includes a liquid display unit LDU1 that is a base component, and a touch panel 14, a cover panel 15 (a protection panel, a cover glass), and a casing 16 that are mounted in the liquid crystal display unit LDU1. The liquid crystal display unit LDU1 includes a liquid crystal panel 11 (a display panel), a backlight device 12 (a lighting device), and a frame 13 (casing member). The liquid crystal panel 11 has a display surface DS1 displaying images on a front side. The backlight device 12 is disposed on the back side of the liquid crystal panel 11 and light exits the backlight device 12 toward the liquid crystal panel 11. The frame 13 presses the liquid crystal panel 11 from the front side or an opposite side from the backlight device 12 with respect to the liquid crystal panel 11 (from a display surface DS1 side). The touch panel 14 and the cover panel 15 are arranged within the frame 13 of the liquid crystal display unit LDU1 from the front side and the frame 13 receives outer peripheral portions (including outer peripheral edge portions) of the panels from the back side.

The touch panel 14 is spaced from the liquid crystal panel 11 on the front side with a predetermined clearance and has a back side (inner side) plate surface that is an opposite surface that is opposite the display surface DS1. The cover panel 15 overlaps the touch panel 14 on the front side and has a back side (inner side) plate surface that is an opposite surface opposite the front side plate surface of the touch panel 14. An antireflection film AR1 is disposed between the touch panel 14 and the cover panel 15 (see FIG. 3). The casing 16 is mounted in the frame 13 to cover the liquid crystal display unit LDU1 from the back side. Among the components of the liquid crystal display devices 10, a part of the frame 13 (a loop portion 13B, which will be described later), the cover panel 15, and the casing 16 provide an outer appearance of the liquid crystal display device 10. The liquid crystal display device 10 of the present embodiment is used in electronic devices such as tablet computers and a screen size thereof is approximately 20 inches.

Figure 3:
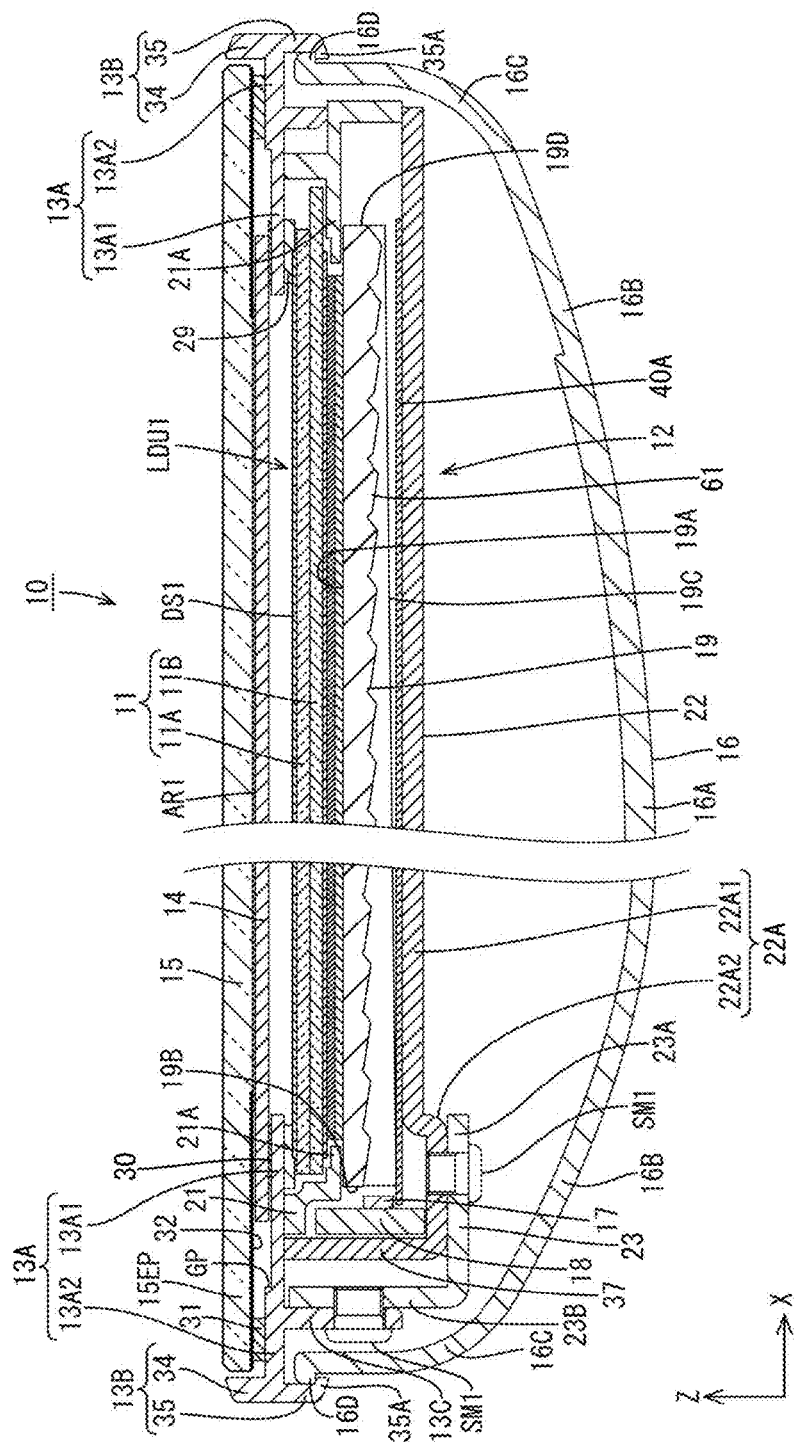
FIG. 3 is a cross-sectional view illustrating a cross-sectional configuration taken in a long-side direction (X-axis direction) of the backlight device of FIG. 2.

The liquid crystal panel 11 included in the liquid crystal display unit LDU1 will be described in detail. The liquid crystal panel 11 displays images with using light from the backlight device 12. As illustrated in FIGS. 1 and 3, the liquid crystal panel 11 includes a pair of substrates 11A, 11B and a liquid crystal layer (not illustrated) interposed between the substrates 11A, 11B. The substrates 11A, 11B have a plan view rectangular shape and are made of glass that is substantially transparent and has high transmissivity. The liquid crystal layer includes liquid crystal molecules having optical characteristics that change according to application of the electric field. The substrates 11A, 11B are adhered to each other via a sealing member (not illustrated) with having a gap of the liquid crystal layer therebetween. The liquid crystal panel includes a display area where images are displayed (a middle portion surrounded by a plate surface light blocking layer 32, which will described later) and a non-display area formed in a frame shape surrounding the display area and where no image is displayed (an outer peripheral portion overlapping the plate surface light blocking layer 32). A long-side direction of the liquid crystal panel 11 matches the X-axis direction (a first direction) and a short-side direction matches the Y-axis direction (a second direction), and a thickness direction matches the Z-axis direction.

Among the substrates 11A, 11B, a front-side (front-surface side) one is a color filter (CF) substrate 11A and a back-side (rear-surface side) one is an array substrate 11B. TFTs (thin film transistors), which are switching components, and pixel electrodes are disposed on an inner surface side (a liquid crystal layer side, on a side opposite the CF board 11A) with respect to the array board 11B. Gate lines and source lines are routed in a matrix near the TFTs and the pixel electrodes. The gate lines and the source lines receive certain image signals from a control circuit (not illustrated). The pixel electrode that is arranged in a square area defined by the gate lines and the source lines may be a transparent conductive film made of ITO (Indium Oxide Tin), and ZnO (Zinc oxide).

On the CF substrate 11A, color filters are arranged to overlap each of the pixel electrodes. The color filters includes red (R), green (G), and blue (B) color portions that are arranged alternately. A light blocking layer (a black matrix) is formed between the color portions to prevent mixing of the colors. Counter electrodes are arranged on surfaces of the color filter and the light blocking layer. The counter electrodes are opposite the pixel electrodes on the array substrate 11B side. The CF substrate 11A is slightly smaller than the array substrate 11B. Alignment films are disposed on the inner surface side of the substrates 11A, 11B to align the liquid crystal molecules included in the liquid crystal layer. Polarizing plates (not illustrated) are attached to the outer surfaces of the substrates 11A and 11B.

Figure 2:
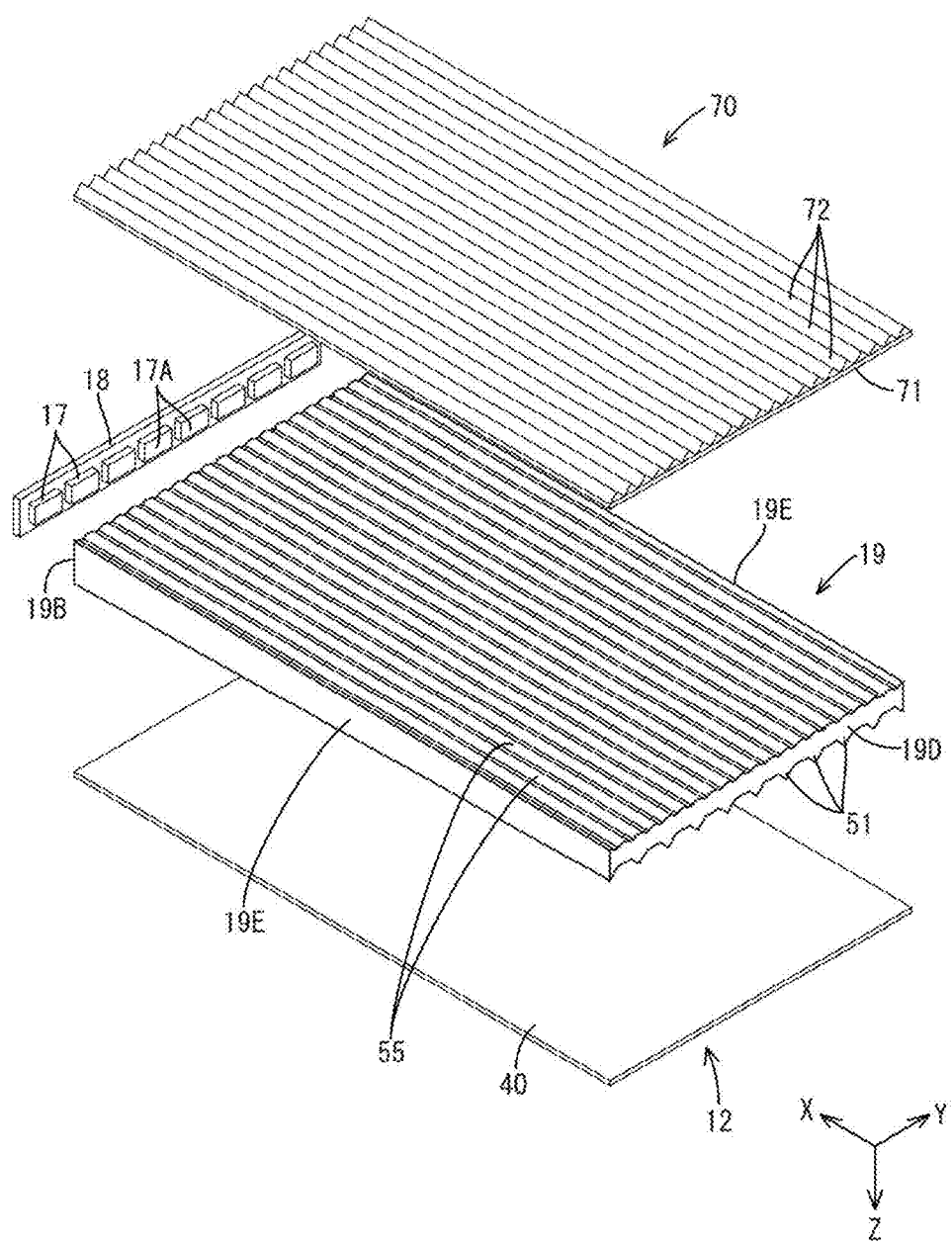
FIG. 2 is an exploded perspective view illustrating a general configuration of a backlight device included in the liquid crystal display device.

Next, the backlight device 12 of the liquid crystal display unit LDU1 will be described in detail. As illustrated in FIG. 1, the backlight device 12 has a plan-view rectangular block shape as a whole similar to that of the liquid crystal panel 11. As illustrated in FIGS. 2 and 3, the backlight device 12 includes LEDs 17 (light emitting diodes) that are light sources, an LED board 18 (a light source board) where the LEDs 17 are mounted, a light guide plate 19 that guides light from the LEDs 17, a light reflection sheet 40 (a light reflecting member) that reflects light from the light guide plate 19, a prism sheet 70 (a light collection sheet) that is disposed to cover the light guide plate 19, a light blocking frame 21 that presses the light guide plate 19 from the front side, a chassis 22 where the LED board 18, the light guide plate 19, the prism sheet 70, and the light blocking frame 21 are arranged, and a heat dissipation member 23 that is arranged to be in contact with an outer surface of the chassis 22. The backlight device 12 includes the LEDs 17 (the LED board 18) on a short-side edge portion of an outer peripheral portion thereof and light enters through one side surface. The backlight device 12 is an edge-light type (a side-light type).

The LEDs 17 are mounted on a base board that is fixed on the LED board 18 and the LEDs 17 are configured by enclosing LED chips with resin material on the base board. The LED chips mounted on the base board emit light having one main light emission wavelength (approximately 420 nm to 500 nm) and specifically emit single blue light. Phosphors are dispersed in the resin material with which the LED chips are enclosed and the phosphors are excited by the blue light emitted by the LED chips and emits light of predetermined color and the LEDs 17 emit substantially white light as a whole. As the phosphors, yellow phosphors that emit yellow light, green phosphors that emit green light, and red phosphors that emit red light may be used in combination or the phosphors of a single color may be used. The LEDs 17 are side-surface emitting type where side surfaces of the LEDs 17 are light emitting surfaces 17A. The side surfaces of the LEDs 17 are opposite surfaces from the mounting surfaces that are mounted on the LED board 18.

As illustrated in FIG. 2, the LED board 18 has an elongated plate shape that extends in the Y-axis direction (in the short side direction of the light guide plate 19 and the chassis 22). The LED board 18 is arranged in the chassis 22 such that a plate surface thereof is parallel to a Y-Z plane or is perpendicular to plate surfaces of the liquid crystal panel 11 and the light guide plate 19. Namely, the LED board 18 is arranged such that a long-side direction of the plate surface thereof matches the Y-axis direction and a short-side direction matches the Z-axis direction, and a thickness direction that is perpendicular to the plate surface thereof matches the X-axis direction. The LED board 18 is arranged such that an inner plate surface thereof is opposite a short-side edge surface of the light guide plate (a light entrance surface 19B, a light source opposing edge surface) with a predetermined clearance in the X-axis direction. Therefore, a direction in which the LEDs 17, the LED board 18, and the light guide plate 19 are arranged substantially matches the X-axis direction. The LED board 18 has a length dimension that is substantially same as or greater than the short-side dimension of the light guide plate 19 and is mounted on a short-side edge portion of the chassis 22, which will be described later.

The LEDs 17 are mounted on a mounting surface (an opposing surface opposite the light guide plate 19) of the LED board 18. An LED unit is configured by mounting the LEDs 17 on the LED board 18. The LEDs 17 are arranged along a line in a longitudinal direction (the Y-axis direction) of the LED board 18 at a predetermined interval. The LEDs 17 are arranged at an interval in the short-side direction on the short-side edge portion of the backlight device 12. The interval (an arrangement interval) between the adjacent LEDs 17 is substantially equal. The LED board 18 includes a tracing pattern (not illustrated) on the mounting surface thereof. The tracing pattern is made of a metal film (such as a copper foil) and extends in the Y-axis direction to cross the LEDs 17 and connect the adjacent LEDs 17 in series. The tracing pattern has end terminals that are connected to an external LED driving circuit so that driving power is supplied to the LEDs 17. A substrate of the LED board 18 is metal same as the chassis 22 and the tracing pattern (not illustrated) is formed on the surface of the substrate via an insulation layer. An insulation material such as ceramics may be used for the substrate of the LED board 18.

The light guide plate 19 is made of synthetic resin that has refractive index greater than air and high transmissivity and is substantially transparent (acrylic resin such as PMMA). As illustrated in FIGS. 2 and 3, the light guide plate 19 has a substantially rectangular plan-view plate shape similar to that of the liquid crystal panel 11. The light guide plate 19 has a plate surface that is parallel to the plate surface of the liquid crystal panel 11 (the display surface DS1). On the plate surface of the light guide plate 19, a long-side direction matches the X-axis direction, a short-side direction matches the Y-axis direction, and a plate thickness direction that is perpendicular to the plate surface matches the Z-axis direction. The light guide plate 19 that is made of acrylic resin such as PMMA has refractive index of approximately 1.49 and has a critical angle of approximately 42°. The material of the light guide plate 19 is not limited thereto.

As illustrated in FIG. 3, the light guide plate 19 is arranged directly below the liquid crystal panel 11 and the prism sheet 70 within the chassis 22. Among edge surfaces of the light guide plate 19, one short-side edge surface (the light entrance surface 19B) is opposite the LEDs 17 on the LED board 18 that is arranged in the short-side edge portion of the chassis 22. According to such a configuration, an arrangement direction in which the LEDs 17 (the LED board 18) and the light guide plate 19 are arranged matches the X-axis direction and an arrangement direction in which the prism sheet 70 (or the liquid crystal panel 11) and the light guide plate 19 are arranged (overlapped) matches the Z-axis direction, and the arrangement directions are perpendicular to each other.

Figure 4:
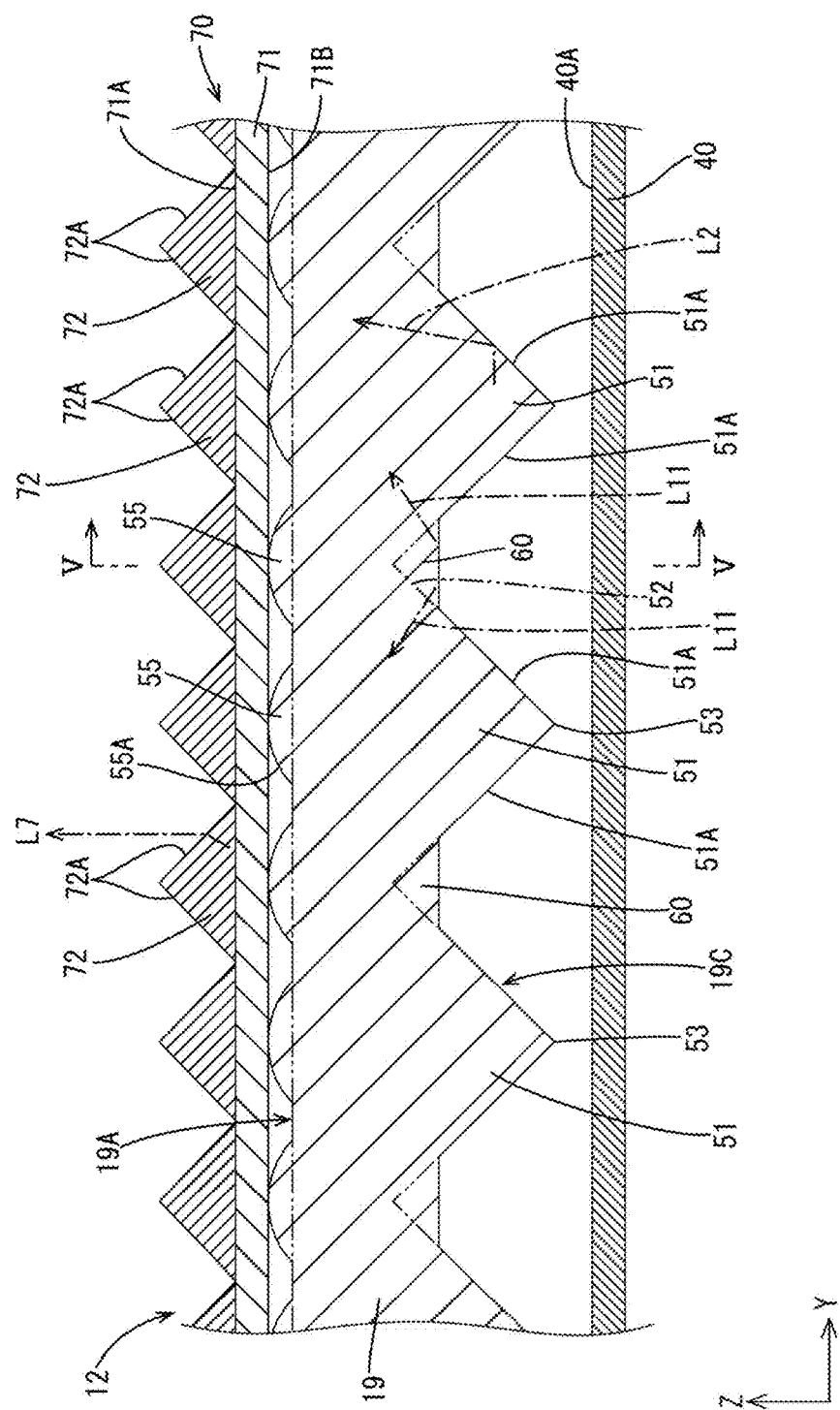
FIG. 4 is a cross-sectional view illustrating a cross-sectional configuration taken in a short-side direction (Y-axis direction) of the backlight device in FIG. 2 (taken along line V-V in FIG. 4).

The light entrance surface 19B of the light guide plate 19 extends in the Y-axis direction (one side direction of the light guide plate 19) and is perpendicular to the plate surface of the light guide plate (a light exit surface 19A, an opposite plate surface 19C). The LEDs 17 are arranged in the longitudinal direction of the light entrance surface 19B. As illustrated in FIGS. 3 and 4, the light guide plate 19 has a front-side (light exit-side) plate surface that is the light exit surface 19A through which light within the light guide plate 19 exit outward and has a back-side (light exit-side) plate surface that is the opposite plate surface 19C. Light exits the light guide plate 19 through the light exit surface 19A toward the prism sheet 70 and the liquid crystal panel 11. Light exits the light guide plate 19 through the back-side light exit surface 19C toward a light reflection sheet 40, which will be described later. The light guide plate 19 has long-side edge surfaces that are side edge surfaces 19E, 19E. Light from the LEDs 17 enters the light guide plate 19 through the light entrance surface 19B and the light reflects off the light reflection sheet 40 or totally reflects off the light exit surface 19A, the opposite plate surface 19C, and other outer peripheral edge surfaces (the edge surface 19D opposite from the light entrance surface 19B, and side edge surfaces 19E). Thus, the light effectively travels within the light guide plate 19.

As illustrated in FIG. 3, the light blocking frame 21 is formed in substantially a frame shape that extends along the outer peripheral portion (an outer peripheral edge portion) of the light guide plate 19. The light blocking frame 21 is configured to press substantially an entire outer peripheral portion of the light guide plate 19 from the front side. The light blocking frame 21 is made of synthetic resin and has a black surface to have a light blocking property. The light blocking frame 21 has an inner edge portion 21A that is disposed between the outer peripheral portion of the light guide plate 19 and the outer peripheral portion (outer peripheral edge portion) of the liquid crystal panel 11 and between the LEDs 17 and the outer peripheral portion (outer peripheral edge portion) of the prism sheet 70 over an entire periphery. According to such a configuration, a part of the rays of light emitted by the LEDs 17 and may not enter the light guide plate 19 through the light entrance surface 19B or leak from the light guide plate 19 through the outer peripheral edge surface thereof, and such light is less likely to directly enter the liquid crystal panel 11 and the prism sheet 70 through the outer peripheral portions thereof (especially edge surfaces).

The chassis 22 is made of a metal plate having good thermal conductivity such as aluminum plate or electro-galvanized steel plate (SECC). As illustrated in FIG. 3, the chassis 22 includes a bottom plate 22A that has a rectangular plan view shape similar to the liquid crystal panel 11, and side plates 37 each of which extends from an outer edge of each side (each of the long sides and each of the short sides) of the bottom plate 22A toward the front side. In the chassis 22 (or the bottom plate 22A), a long-side direction matches the X-axis direction and a short-side direction matches the Y-axis direction. Most part of the bottom plate 22A is a light guide plate support portion 22A1 that supports the light guide plate 19 from the back side and the bottom plate 22A has a base board arrangement portion 22A2 on the edge portion thereof near the LED board 18. The base board arrangement portion 22A2 projects toward the back side to form a step. A short-side side plate 37 that extends from the base board arrangement portion 22A2 is a base board mount portion where the LED board 18 is mounted. The LED board 18 is fixed on an inner plate surface of the side plate 37 via a base board fixing member such as a double-sided adhesive tape. A liquid panel drive circuit board (not illustrated) that controls driving of the liquid crystal panel 11, an LED drive circuit board (not illustrated) that supplies driving power to the LEDs 17, and a touch panel drive circuit board (not illustrated) that controls driving of the touch panel 14 are mounted on the rear plate surface of the bottom plate 22A of the chassis 22.

The heat dissipation member 23 is made of a metal plate having good thermal conductivity such as an aluminum plate. As illustrated in FIG. 3, the heat dissipation member 23 extends along a short-side edge portion of the chassis 22 or the base board arrangement portion 22A2 where the LED board 18 is arranged. The heat dissipation member 23 has a substantially L-shaped cross section and includes a first heat dissipation portion 23A that is in contact with an outer surface of the base board arrangement portion 22A2 and a second heat dissipation portion 23B that is parallel to an outer surface of the side plate 37. The first heat dissipation portion 23A is fixed to the base board arrangement portion 22A2 with screws SM1. Accordingly, heat generated by the LEDs 17 is transferred to the first heat dissipation portion 23A via the LED board 18, the side plate 37 (the base board mount portion), and the base board arrangement portion 22A2.

Next, the frame 13 included in the liquid crystal display unit LDU1 will be described. The frame 13 is made of metal material having good thermal conductivity such as aluminum. As illustrated in FIG. 1, the frame 13 is formed in a rectangular frame plan view shape as a whole and the frame 13 extends along each of the outer peripheral portions (the outer peripheral edge portions) of the liquid crystal panel 11, the touch panel 14, and the cover panel 15. The frame 13 may be manufactured with pressing. As illustrated in FIG. 3, the frame 13 presses the outer peripheral portion of the liquid crystal panel 11 from the front side and the frame 13 and the chassis 22 hold the liquid crystal panel 11, the prism sheet 70, and the light guide plate 19 therebetween. The frame 13 receives each of the outer peripheral portions of the touch panel 14 and the cover panel 15 from the rear side thereof and is disposed between the outer peripheral portions of the liquid crystal panel 11 and the touch panel 14. According to such a configuration, a certain clearance is provided between the liquid crystal panel 11 and the touch panel 14. Therefore, if an external force acts on the cover panel 15 and the touch panel 14 is deformed toward the liquid crystal panel 11 according to deformation of the cover panel 15, the deformed touch panel 14 is less likely to be in contact with the liquid crystal panel 11.

As illustrated in FIG. 3, the frame 13 includes a frame portion 13A, the loop portion 13B, and mount plate portion 13C. The frame portion 13A extends along each of the outer peripheral portions of the liquid crystal panel 11, the touch panel 14, and the cover panel 15. The loop portion 13B extends from the outer peripheral edge portion of the frame portion 13A and surrounds the touch panel 14, the cover panel 15, and the casing 16 from the outer peripheral side. The mount plate portion 13C projects from the frame portion 13A toward the back side and is mounted on the chassis 22 and the heat dissipation member 23. The frame portion 13A is formed in substantially a plate having a plate surface parallel to each of the plate surfaces of the liquid crystal panel 11, the touch panel 14, and the cover panel 15 and has a rectangular frame plan view shape. The frame portion 13A includes an inner peripheral portion 13A1 and an outer peripheral portion 13A2 that is relatively thicker than the inner peripheral portion 13A1. A level gap GP is provided at a border of the inner peripheral portion 13A1 and the outer peripheral portion 13A2. The inner peripheral portion 13A1 of the frame portion 13A is between the outer peripheral portion of the liquid crystal panel 11 and the outer peripheral portion of the touch panel 14 and the outer peripheral portion 13A2 receives the outer peripheral portion of the cover panel 15 from the back side thereof.

A substantially entire area of the front side plate surface of the frame portion 13A is covered with the cover panel 15, and the front side plate surface is less likely to be exposed to the outside. Therefore, even if a temperature of the frame 13 is increased due to heat from the LEDs 17, a user of the liquid crystal display device 10 is less likely to touch an exposed portion of the frame 13 and the device is good in safety. As illustrated in FIG. 3, a buffer member 29 is fixed on the back side plate surface of the inner peripheral portion 13A1 of the frame portion 13A to buffer the outer peripheral portion of the liquid crystal panel 11 and press the outer peripheral portion of the liquid crystal panel 11 from the front side. A first fixing member 30 is fixed on the front side plate surface of the inner peripheral portion 13A1 to buffer the outer peripheral portion of the touch panel 14 and fix it. The buffer member 29 and the first fixing member 30 are arranged to overlap each other with a plan view at the inner peripheral portion 13A1. A second fixing member 31 is fixed on the front side plate surface of the outer peripheral portion 13A2 of the frame portion 13A to buffer the outer peripheral portion of the cover panel 15 and fix it. Each of the buffer member 29 and the fixing members 30, 31 extends along each side portion of the frame portion 13A.

As illustrated in FIG. 3, the loop portion 13B has a rectangular short squarely cylindrical plan view shape as a whole, and includes a first loop portion 34 that extends from the outer peripheral edge of the outer peripheral portion 13A2 of the frame portion 13A toward the front side and a second loop portion 35 that extends from the outer peripheral edge of the outer peripheral portion 13A2 of the frame portion 13A toward the back side. The first loop portion 34 is arranged to surround entirely each of peripheral edge surfaces of the touch panel 14 and the cover panel 15 that are arranged on the front side with respect to the frame portion 13A. The first loop portion 34 has an inner peripheral surface that is opposite each of the outer peripheral edge surfaces of the touch panel 14 and the cover panel 15 and has an outer peripheral surface that is exposed to the outside of the liquid crystal display device 10 and provides an outer appearance of the side surface of the liquid crystal display device 10.

The second loop portion 35 surrounds the front side edge portion (a mount portion 16C) of the casing 16, which is arranged on the back side with respect to the frame portion 13A, from the outer peripheral side. The second loop portion 35 has an inner peripheral surface that is opposite the mount portion 16C of the casing 16 (described later) and has an outer peripheral surface that is exposed to the outside of the liquid crystal display device 10 and provides the outer appearance of the side surface of the liquid crystal display device 10.

As illustrated in FIG. 3, the mount plate portion 13C projects from the outer peripheral portion 13A2 of the frame portion 13A toward the back side and is a plate extending along each of the sides of the frame portion 13A. The plate surface of the mount plate portion 13C is substantially perpendicular to the plate surface of the frame portion 13A. The mount plate portion 13C projects from each of the side portions of the frame portion 13A. The mount plate portion 13C projecting from the short-side portion of the frame portion 13A near the LED board 18 has an inner plate surface that is in contact with an outer plate surface of the second heat dissipation portion 23B of the heat dissipation member 23. The mount plate portion 13C is fixed on the second heat dissipation portion 23B with screws SM1. Accordingly, heat from the LEDs 17 is transferred from the first heat dissipation portion 23A to the second heat dissipation portion 23B and then transferred to the mount plate portion 13C and further to the whole frame 13. Thus, the heat dissipates effectively.

Next, the touch panel 14 will be described. As illustrated in FIGS. 1 and 3, the touch panel 14 is a position input device with which position information within a surface area of the display surface DS1 of the liquid crystal panel 11 is input by a user. The touch panel 14 includes a rectangular glass substrate that is substantially transparent and has good light transmissivity and a predetermined touch panel pattern (not illustrated) is formed on the glass substrate. Specifically, the touch panel 14 includes a glass substrate having a plan view rectangular shape similar to the liquid crystal panel 11 and a touch panel transparent electrode portion (not illustrated) on the front sideplate surface thereof. The touch panel transparent electrode portion forms a projection-capacitive touch panel pattern and the touch panel transparent electrode portions are arranged in rows and columns within the plane surface of the substrate.

The short side edge portion of the touch panel 14 includes a terminal portion (not illustrated) that connected to an end portion of a trace extending from the touch panel transparent electrode portion of the touch panel pattern. A flexible board (not illustrated) is connected to the terminal portion so that a potential is supplied from the touch panel drive circuit board to the touch panel transparent electrode portion that forms the touch panel pattern. As illustrated in FIG. 3, the inner plate surface of the outer peripheral portion of the touch panel 14 is fixed to the inner peripheral portion 13A1 of the frame portion 13A of the frame 13 via the first fixing member 30.

Next, the cover panel 15 will be described. As illustrated in FIGS. 1 and 3, the cover panel 15 is arranged to cover an entire area of the touch panel 14 from the front side and protect the touch panel 14 and the liquid crystal panel 11. The cover panel 15 covers an entire area of the frame portion 13A of the frame 13 from the front side and provides a front side outer appearance of the liquid crystal display device 10. The cover panel 15 has a rectangular plan view shape and is made of glass plate substrate that is substantially transparent and has good light transmissivity. The cover panel 15 is preferably made of toughened glass.

Chemically toughened glass including a chemically toughened layer on a surface thereof is preferably used as the toughened glass of the cover panel 15. The chemically toughened layer is provided by performing chemically toughening treatment on the surface of a glass plate substrate. The chemically toughening treatment is performed such that alkali metal ion contained in glass material is replaced with alkali metal ion having a greater ion radius with ion exchange treatment to strengthen the glass plate substrate. The obtained chemically toughened layer is a compressive stress layer (an ion exchange layer) where compressive stress remains. Therefore, the cover panel 15 has great mechanical strength and good shock resistance property, and the touch panel 14 and the liquid crystal panel 11 arranged on the back side of the cover panel 15 are not broken or damaged.

The cover panel 15 has a plan view size greater than that of the liquid crystal panel 11 and the touch panel 14. Therefore, the cover panel 15 has an extended portion 15EP extending outward further from each of the outer peripheral edges of the liquid crystal panel 11 and the touch panel 14 over an entire periphery. The extended portion 15EP has a rectangular frame shape surrounding the liquid crystal panel 11 and the touch panel 14. As illustrated in FIG. 3, the extended portion 15EP has an inner plate surface that is fixed to and opposite the outer peripheral portion 13A2 of the frame portion 13A of the frame 13 via the second fixing member 31. A middle portion of the cover panel 15 is opposite the touch panel 14 and is layered on the front side of the touch panel 14 via the antireflection film AR1.

As illustrated in FIG. 3, the plate surface light blocking layer 32 (a light blocking layer, a plate surface light blocking portion) is formed on the outer peripheral portion of the cover panel 15 including the extended portion 15EP on the back sideplate surface thereof (a plate surface facing the touch panel 14). The plate surface light blocking layer 32 is made of light blocking material such as black coating material and such light blocking material is printed on the inner plate surface of the cover panel 15. Thus, the plate surface light blocking layer 32 is integrally formed on the plate surface of the cover panel 15. The plate surface light blocking layer 32 may be printed with printing methods such as screen printing or ink jet printing. The plate surface light blocking layer 32 is formed on an entire area of the extended portion 15EP of the cover panel 15 and a portion of the cover panel 15 that is inside the extended portion 15EP and overlaps each of the outer peripheral portions of the touch panel 14 and the liquid crystal panel 11 in a plan view. Accordingly, the plate surface light blocking layer 32 is arranged to surround the display area of the liquid crystal panel 11 and blocks light outside the display area. Therefore, display quality of images displayed in the display area is improved.

Next, the casing 16 will be described. The casing 16 is made of synthetic resin or metal material, and as illustrated in FIGS. 1 and 3, the casing 16 has substantially a bowl shape that is open toward the front side. The casing 16 covers the frame portion 13A and the mount plate portion 13C of the frame 13, the chassis 22, and the heat dissipation member 23 from the back side and provides the back side outer appearance of the liquid crystal display device 10. As illustrated in FIG. 3, the casing 16 includes substantially a flat bottom portion 16A, curved portions 16B, and mount portions 16C. The curved portions 16B extend from the respective outer peripheral edges of the bottom portion 16A toward the front side and have a curved cross sectional shape. The mount portions 16C extend substantially vertically from the respective outer peripheral edges of the curved portions 16B toward the front side. Each of the mount portions 16C has a casing side stopper portion 16D having a hooked cross sectional shape. The casing side stopper portion 16D is stopped by a frame side stopper portion 35A of the frame 13 such that the casing 16 is mounted in the frame 13.

Next, the light reflection sheet 40 will be described. The light reflection sheet 40 may be made of synthetic resin and has a white surface (a light reflection surface 40A) having good light reflectivity. The material and the color of the light reflection sheet 40 are not necessarily limited thereto. The light reflection sheet 40 is disposed on the bottom plate 22A of the chassis 22 and covers an entire area of the opposite plate surface 19C. The light reflection sheet 40 has an edge portion near the LEDs 17 and the edge portion is closer to the LEDs 17 than the light entrance surface 19B, as illustrated in FIG. 3. Accordingly, the light emitted by the LEDs 17 is reflected by the edge portion of the light reflection sheet 40 and light entrance efficiency of light entering through the light entrance surface 19B is improved.

A configuration of the light guide plate 19 will be described in detail. As illustrated in FIG. 4, the light guide plate 19 includes prism portions 51 and exit light reflection portions 60 on the opposite plate surface 19C and lens portions 55 on the light exit surface 19A. As illustrated in FIGS. 2 and 3, the prism portions 51 (light collecting portions) are arranged in the Y-axis direction (a predetermined direction) and extend in the X-axis direction (a direction perpendicular to an arrangement direction of the prism portions 51). As illustrated in FIG. 4, the prism portions 51 project from the opposite plate surface 19C toward the back side (a light reflection sheet 40 side). Each of the prism portions 51 has a triangular cross-sectional shape and includes a pair of inclined surfaces 51A, 51A.

The prism portions 51 change optical properties of light that travels within the light guide plate 19 and reaches the inclined surface 51A as described below. A part of the rays of light reaching the inclined surface 51A is incident on the inclined surface 51A at an angle of incident greater than the critical angle and such light is totally reflected by the inclined surface 51A. A part of the totally reflected rays of light (illustrated by an arrow L2 in FIG. 4) is collected in the Z-axis direction (in a direction of a normal line of the light exit surface 19A) with respect to the Y-axis direction (an arrangement direction of the LEDs 17). Some of the rays of light that is totally reflected by the inclined surface 51A may be dispersed in the Y-axis direction.

A part of the rays of light reaching the inclined surface 51A that is incident on the inclined surface 51A at an angle of incident not greater than the critical angle is refracted by the inclined surface 51A and exits the light guide plate 19 toward the light reflection sheet 40. The light exiting toward the light reflection sheet 40 is reflected by the light reflection sheet 40 and enters the light guide plate 19 with being refracted by the inclined surface 51A. The light refracted by the inclined surface 51A is collected or dispersed with respect to the Y-axis direction according to the angle of incident on the inclined surface 51A. By providing the inclined surfaces 51A, the collection (or dispersing) of light with respect to the Y-axis direction is controlled, and the front luminance of the light exiting the light guide plate 19 is increased and unevenness of luminance of the light with respect to the Y-axis direction is less likely to be caused.

Figure 5:
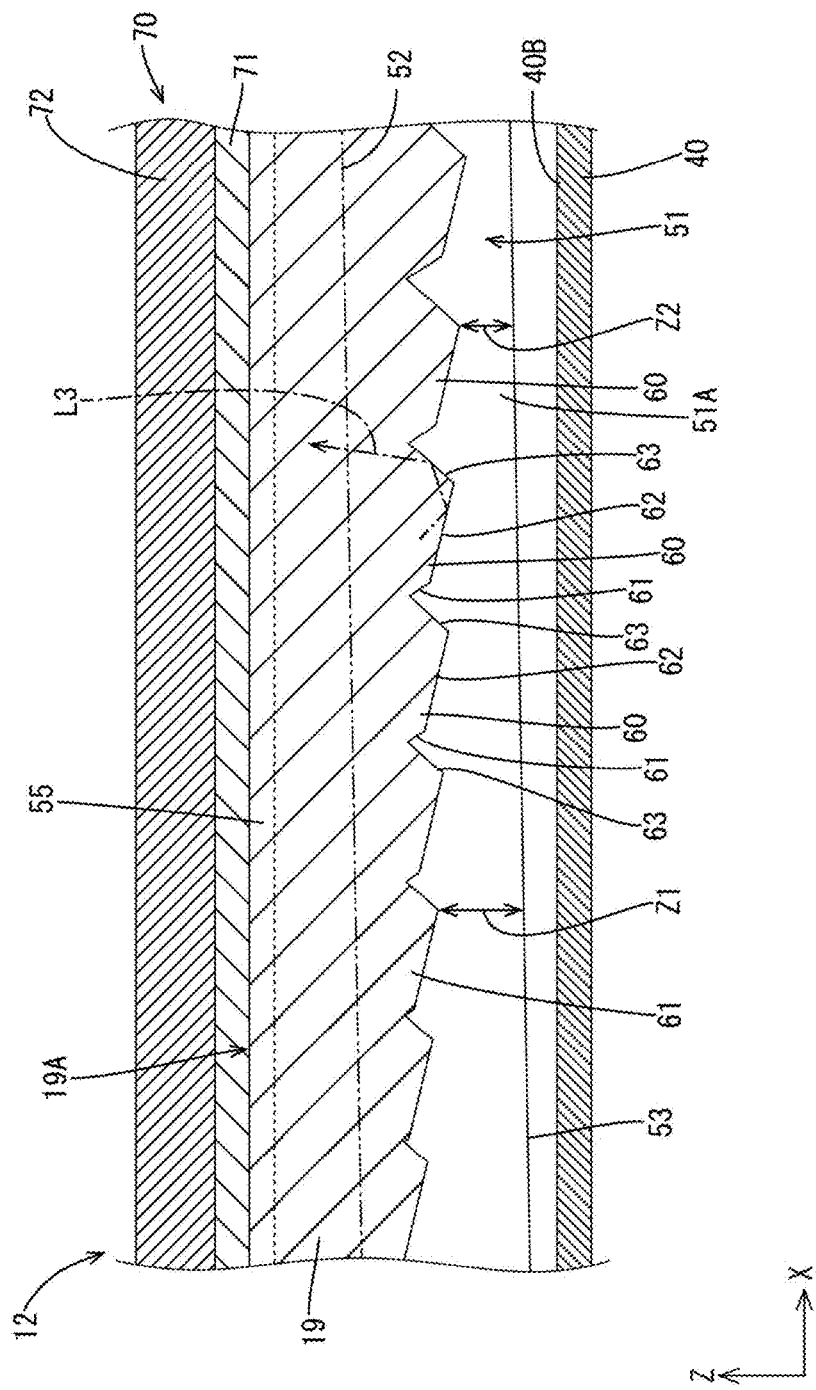
FIG. 5 is a cross-sectional view illustrating a vicinity of a light guide plate of the backlight device in FIG. 3 (taken along line V-V in FIG. 4.

As illustrated in FIG. 5, the exit light reflection portions 60 are arranged in the X-axis direction (a direction of a normal line of the light entrance surface 19B). The exit light reflection portions 60 are prism portions and each of the exit light reflection portions 60 includes three inclined surfaces each of which has a different inclined angle (a first inclined surface 61, a second inclined surface 62, a third inclined surface 63). As illustrated in FIG. 6, the exit light reflection portions 60 are disposed in a recessed portion 52 between the adjacent two prism portions 51, 51. Namely, the first inclined surface 61, the second inclined surface 62, the third inclined surface 63 are provided to connect the opposed two inclined surfaces 51A, 51A.

The first inclined surface 61 is inclined to be closer to the light reflection sheet 40 (a lower side in FIG. 4) as is farther away from the LEDs 17 (the light entrance surface 19B) in the X-axis direction. The second inclined surface 62 is inclined to be closer to the light reflection sheet 40 (the lower side in FIG. 4) as is farther away from the LEDs 17 in the X-axis direction. The second inclined surface 62 is continuous from one end of the first inclined surface 61 (an end portion farther from the LEDs 17) and the second inclined surface 62 has an inclination angle with respect to the X-axis that is smaller than an inclination angle of the first inclined surface 61. The third inclined surface 63 (an inclined surface) is inclined to be closer to the light exit surface 19A (a plate surface without having the exit light reflection portions 60, an upper side in FIG. 4) as is farther away from the LEDs 17 in the X-axis direction. The third inclined surface 63 is continuous from one end of the second inclined surface (an end portion farther from the LEDs 17).

Among the rays of light travelling within the light guide plate 19 and reaching the third inclined surface 63 from the LED 17 side (the left side in FIG. 4), light entering through the third inclined surface 63 at an incident angle not less than a critical angle is reflected by the third inclined surface 63 in a direction toward the light exit surface 19A (as is represented by an arrow L3 in FIG. 5). The light is reflected by the third inclined surface 63 toward in a direction of the Z-axis direction (a direction of the normal line of the plate surface (the light exit surface 19A) of the light guide plate 19, a thickness direction of the light guide plate 19). Accordingly, light reflecting off the third inclined surface 63 is incident on the light exit surface 19A at an angle of incident not greater than the critical angle (the light is not totally reflected by the light exit surface 19A). Thus, such light exits the light guide plate through the light exit surface 19A.

The third inclined surfaces 63 are provided in the X-axis direction (in direction farther from the light source) and have an area that increases as is farther away from the LEDs 17. According, the amount of light exiting through the light exit surface 19A is even within a surface area of the light exit surface 19A. Further, as illustrated by the arrow L3 in FIG. 4, the light reflects off the second inclined surface 62 so that the light is likely to reach the third inclined surface 63 and a greater amount of light reflects off the second inclined surface 62 in a direction toward the light exit surface 19A. By providing the first inclined surface 61, the third inclined surface 63 has one end that is closer to the light exit surface 19A compared to a configuration without having the first inclined surface 61. Accordingly, the third inclined surface 63 has greater area.

As illustrated in FIG. 5, each prism portion 51 has a ridge line 53 and the ridge line 53 extends in the arrangement direction of the exit light reflection portions 60 and is slightly inclined with respect to the X-axis. Specifically, the ridge line 53 is inclined with respect to the X-axis to approach the front side as is farther away from the LEDs 17. According to such a configuration, a distance (see Z1, Z2 in FIG. 5) between the exit light reflection portions 60 and the ridge line 53 with respect to the Z-axis direction (the plate thickness direction of the light guide plate 19) decreases as is farther away from the LEDs 17. Namely, the exit light reflection portion 60 is closer to the ridge line 53, as is farther away from the LEDs 17.

As illustrated in FIG. 6, the exit light reflection portions 60 are provided to connect the opposed inclined surfaces 51A, 51A of the two adjacent prism portions 51, 51. As illustrated in FIG. 7, the exit light reflection portion 60 increases a length thereof in the Y-axis direction (an up-down direction of FIG. 7) as is closer to the ridge line 53. As illustrated in FIG. 5, the third inclined surface 63 increases a length thereof in the Z-axis direction as is farther away from the LEDs 17. Accordingly, in the present embodiment, among the exit light reflection portions 60 arranged in the X-axis direction, the exit light reflection portion 60 has a greater area as is farther away from the LEDs 17.

The lens portion 55 is a cylindrical lens having a semi-cylindrical shape extending in the X-axis direction. The lens portions 55 are arranged in the Y-axis direction. Thus, the lens portions 55 form a lenticular lens. The lens portions 55 change optical properties of light travelling within the light guide plate 19 as described below. Among the rays of light reaching a surface (an arched surface 55A) of the lens portion 55, the rays of light that are incident on the arched surface 55A at an angle of incident greater than the critical angle are totally reflected by the arched surface 55A and returned toward the opposite plate surface 19C. Most of the rays of the light are dispersed with respect to the Y-axis direction when totally reflected.

Among the rays of light reaching the arched surface 55A of the lens portion 55, the rays of light that are incident on the arched surface 55A at an angle of incident not greater than the critical angle exits through the light exit surface 19A with being refracted by the arched surface 55A. A part of the rays of light that are refracted by the arched surface 55A are collected with respect to the Y-axis direction. By providing such lens portions 55, the collection (or dispersing) of light with respect to the Y-axis direction is controlled and the front luminance of the light exiting the light guide plate 19 is increased and luminance unevenness with respect to the Y-axis direction is less likely to be caused. The light collected with respect to the Y-axis direction by the lens portions 55 is easily collected by a prism sheet 70 with respect to the Y-axis direction. Accordingly, the front luminance of light exiting the prism sheet 70 is further increased.

As illustrated in FIG. 4, the prism sheet 70 is disposed to cover the light exit surface 19A of the light guide plate 19 and includes a base sheet 71 and prism portions (unit light collecting portions) 72. The prism portions 72 are formed on the light exit-side plate surface 71A that is a front-side surface of the base sheet 71. The light exit-side plate surface 71A is a surface opposite from a light entrance-side plate surface 71B of the base sheet 71 and the light exiting the light guide plate 19 enters through the light entrance-side plate surface 71B. The base sheet 71 is made of substantially transparent synthetic resin and specifically made of thermoplastic resin material such as PET and refractive index of the material is approximately 1.667. The prism portions 72 are integrally formed with the light exit-side plate surface 71A of the base sheet 71.

The prism portions 72 are made of substantially transparent ultraviolet-curing resin material that is a kind of photocurable resin. In manufacturing the prism sheet 70, a molding die is filled with uncured ultraviolet-curing resin material and the base sheet 71 is put on an opening edge of the molding die such that the uncured ultraviolet-curing resin material is in contact with the light exit-side plate surface 71A. Then, the ultraviolet-curing resin material is irradiated with ultraviolet rays via the base sheet 71 so as to be cured and the prism portions 72 are integrally formed with the base sheet 71. The ultraviolet-curing resin material of the prism portions 72 is acrylic resin such as PMMA, for example, and refractive index thereof is approximately 1.59.

The prism portions 72 project from the light exit-side plate surface 71A of the base sheet 71 toward the front side (the light exit side). Each of the prism portions 72 has substantially a triangular cross-sectional shape (a mountain shape) taken in the X-axis direction and extends linearly in the Y-axis direction. The prism portions 72 are arranged in the X-axis direction. Each of the prism portions 72 has a width dimension (in the X-axis direction) that is constant over an entire length thereof. Each of the prism portions 72 has substantially an isosceles triangular cross-sectional shape and includes a pair of inclined surfaces 72A.

Light enters the prism sheet 70 having the above configuration through a surface near the light guide plate 19. The light enters the base sheet 71 through the light entrance-side plate surface 71B via an air layer between the light exit surface 19A of the light guide plate 19 and the base sheet 71 of the prism sheet 70. Therefore, the light is refracted at a border surface between the air layer and the light entrance-side plate surface 71B according to the angle of incident. When the light passing through the base sheet 71 exits the base sheet 71 through the light exit-side plate surface 71A and enters the prism portions 72, the light is refracted at a border surface according to the angle of incident. The light travelling through the prism portions 72 reaches the sloped surfaces 72A of the prism portions 72. If the angle of incident on the sloped surface 72A is greater than the critical angle, the light is totally reflected by the sloped surface 72A and returned into the base sheet 71 (retroreflection). If the angle of incident on the sloped surface 72A is not greater than the critical angle, the light is refracted by the border surface and exits the prism portion 72 (illustrated by an arrow L7 in FIG. 4). According to the above configuration, the light exiting the prism portions 72 are collected to travel in a front direction (normal direction of the light exit surface 19A) with respect to the X-axis direction. Namely, the prism portions 72 have anisotropic light collecting properties. Apart of the rays of light exiting the prism portions 72 through the inclined surface 72A may travel toward the adjacent prism portion 72 and enter the adjacent prism portion 72 and return toward the base sheet 71.

Figure 11:
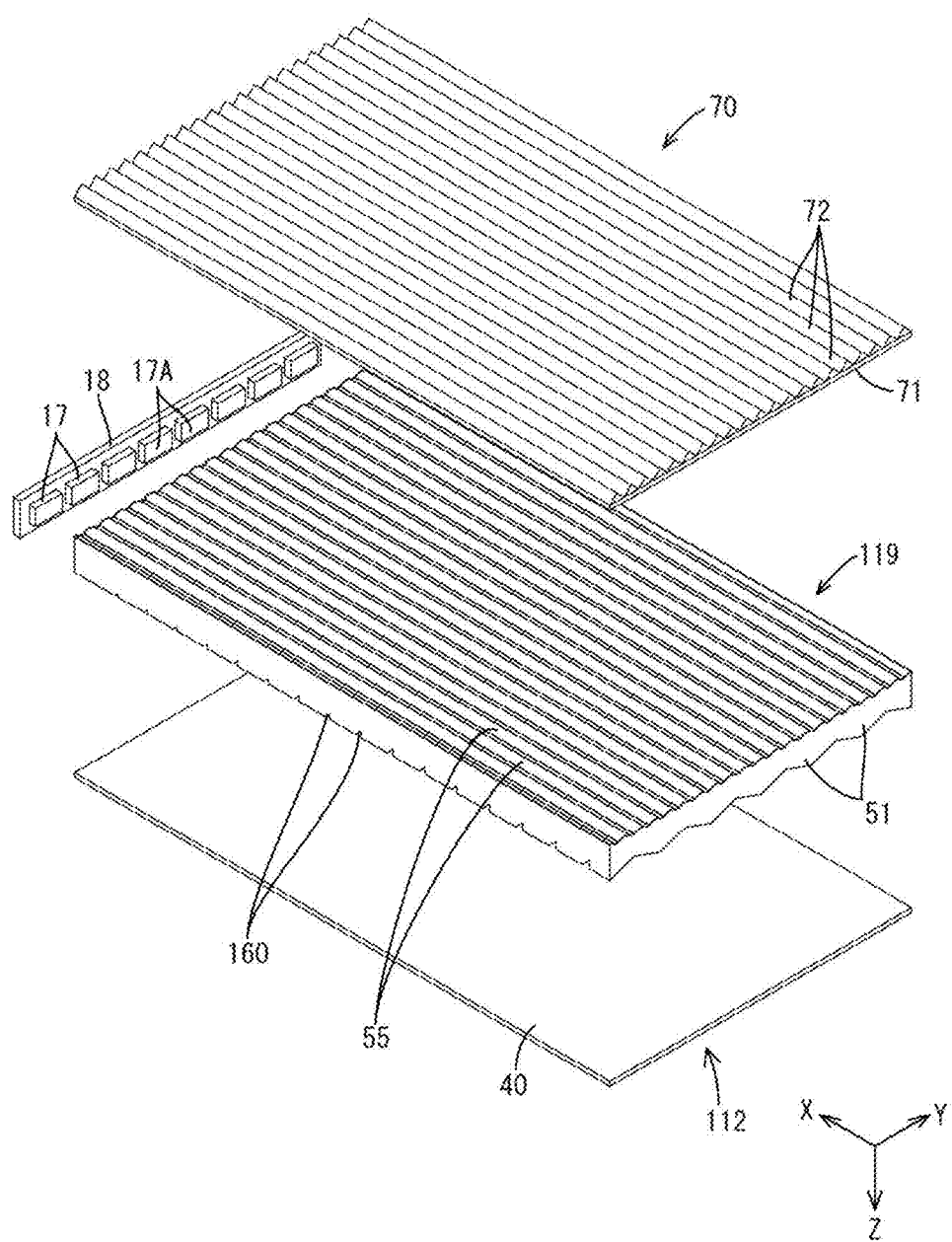
FIG. 11 is an exploded perspective view illustrating a general configuration of a backlight device according to Comparative Example 1.
Figure 12:
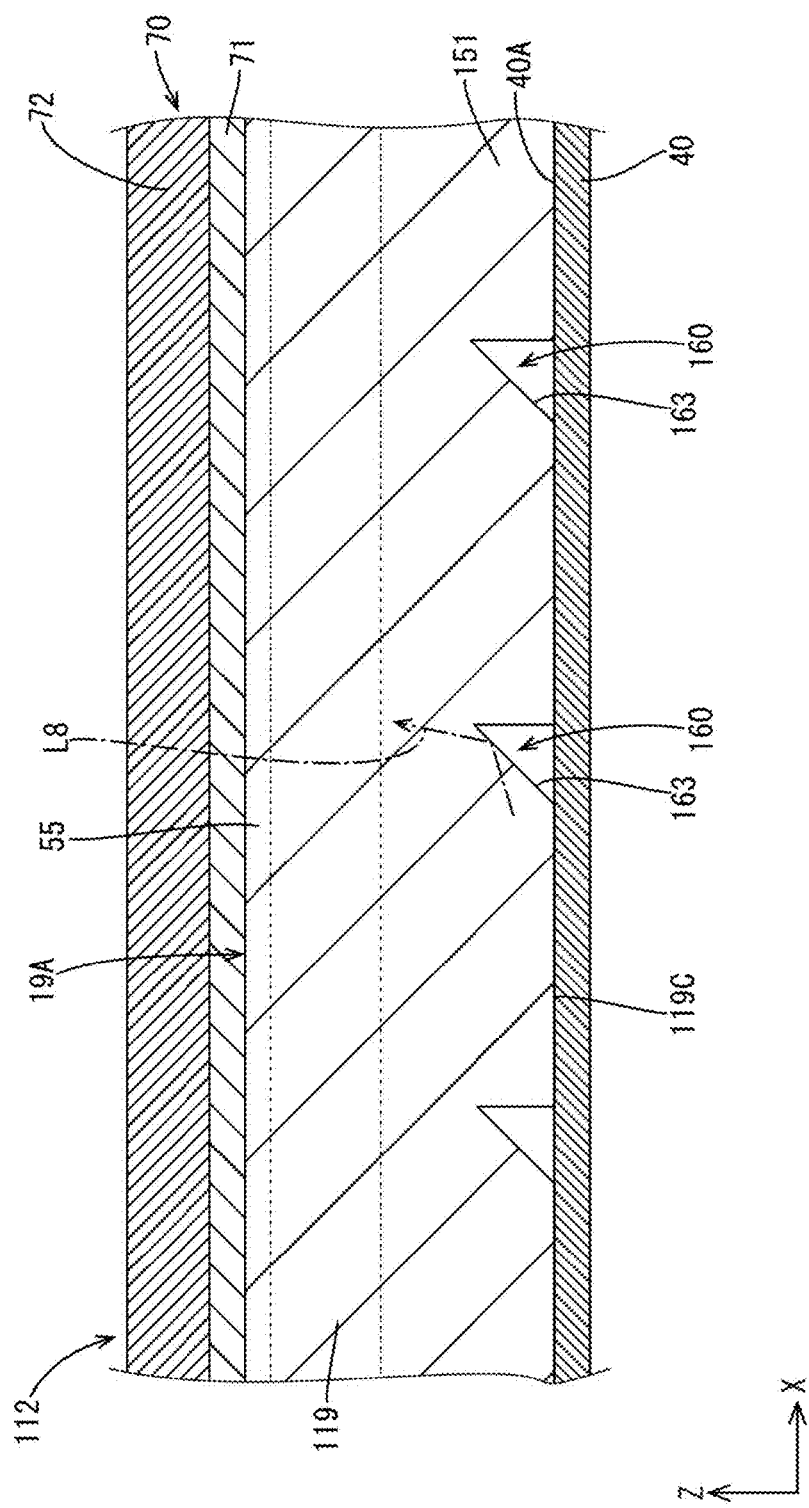
FIG. 12 is a cross-sectional view illustrating a cross-sectional configuration taken in a long-side direction (the X-axis direction) of the backlight device of Comparative Example 1.
Figure 13:
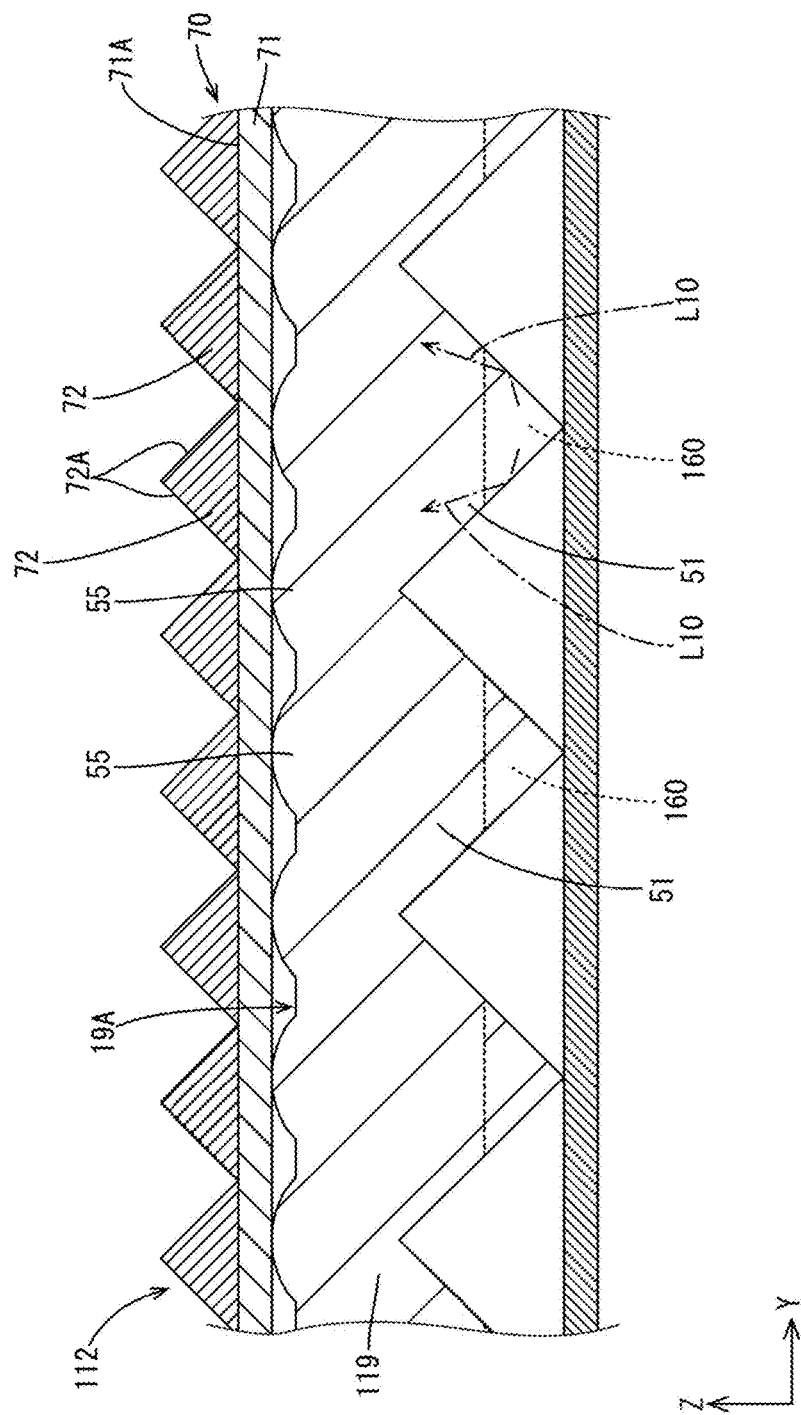
FIG. 13 is a cross-sectional view illustrating a cross-sectional configuration taken in a short-side direction (the Y-axis direction) of the backlight device of Comparative Example 1.
Figure 14:
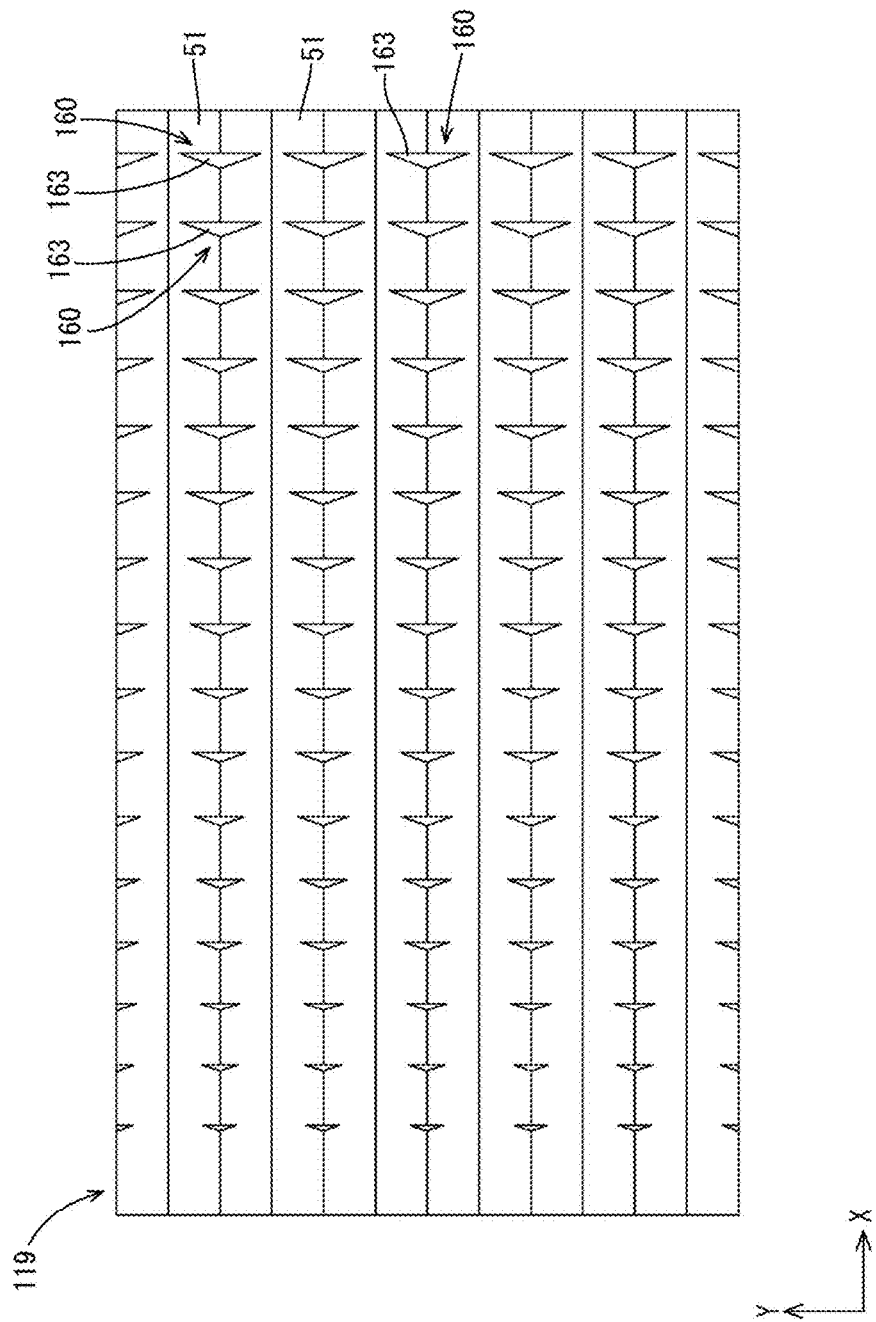
FIG. 14 is a view illustrating an opposite plate surface side of the light guide plate of Comparative Example 1.

Next, the effects of the present embodiment will be described with compared to Comparative Example 1 and Comparative Example 2. A configuration of Comparative Example 1 will be described with reference to FIGS. 11 to 14. As illustrated in FIG. 11, a backlight device 112 of Comparative Example 1 has a configuration of a light guide plate different from that of the present embodiment. As illustrated in FIGS. 12 and 14, a light guide plate 119 of Comparative Example 1 includes exit light reflection portions 160 at apex portions of the respective prism portions 51. As illustrated in FIG. 13, the exit light reflection portion 160 is formed by cutting off a part of an opposite plate surface 119C of the light guide plate 119. The exit light reflection portions 160 have inclined surfaces 163 that are inclined to be closer to the light exit surface 19A as are farther away from the LEDs 17. A part of the rays of light travelling within the light guide plate 119 is reflected by the inclined surface 163 toward the light exit surface 19A (as is illustrated by an arrow L8 in FIG. 12).

Figure 15:
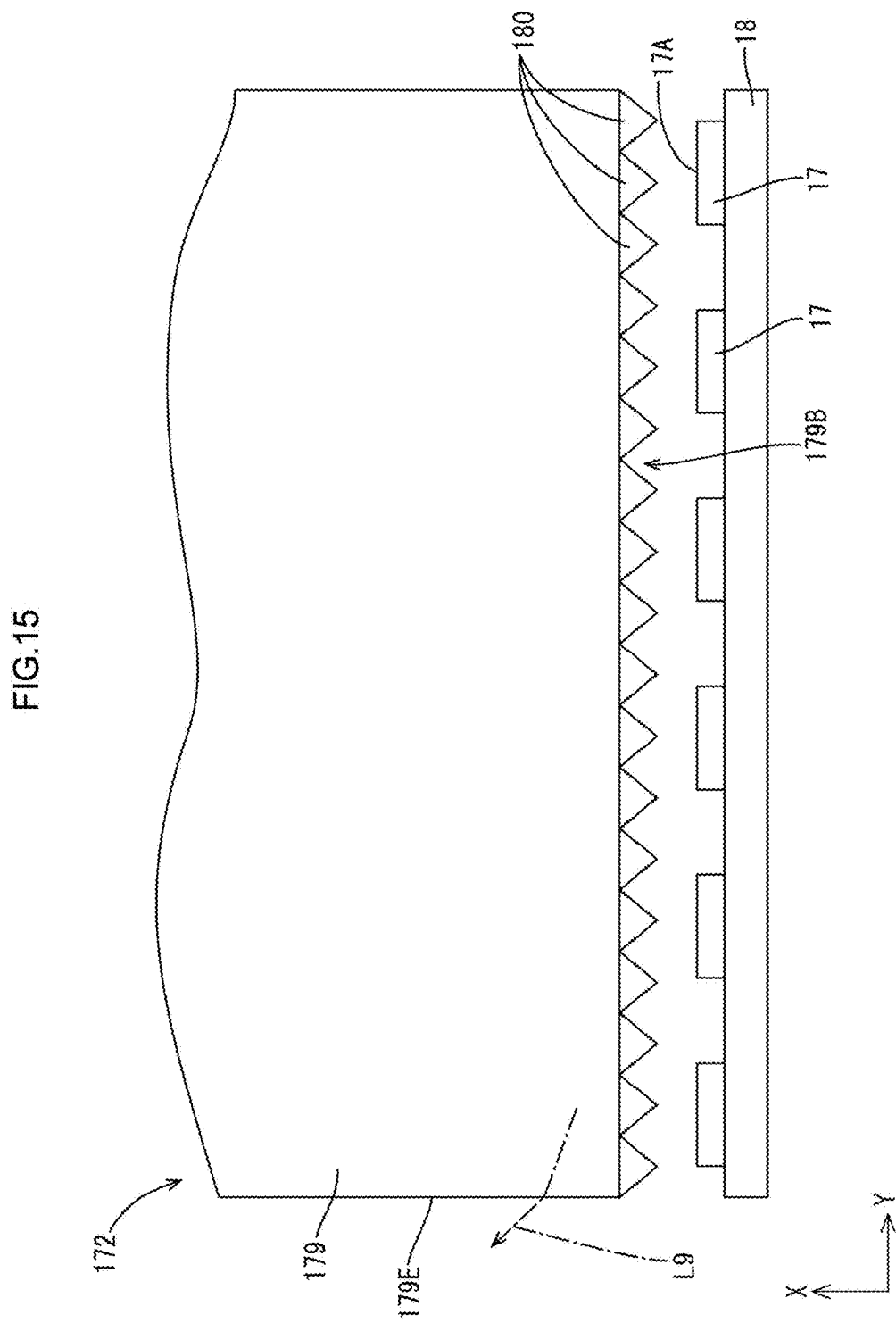
FIG. 15 is a view illustrating a light exit surface side of the light guide plate of Comparative Example 2.

Next, a configuration of Comparative Example 2 will be described with reference to FIG. 15. As illustrated in FIG. 15, a backlight device 172 of Comparative Example 2 has a configuration of a light guide plate different from that of the present embodiment. A light guide plate 179 of Comparative Example 2 includes light entrance prisms 180 (light entrance surface side prism) on a light entrance surface 179B thereof. The light entrance prisms 180 are arranged in the Y-axis direction. Light emitted by the LEDs 17 is dispersed with respect to the Y-axis direction while passing through the light entrance prisms 180. The configuration of Comparative Example 2 is similar to that of Comparative Example 1 except for the light entrance prisms 180.

In the present embodiment, light emitted by the LEDs 17 enters the light guide plate 19 through the light entrance surface 19B and travels within the light guide plate 19. A part of the rays of light travelling within the light guide 19 reaches the exit light reflection portions 60 and a part of the rays of light reaching the exit light reflection portions 60 is reflected by the exit light reflection portions 60 and exits the light guide plate 19. Apart of the rays of light travelling within the light guide 19 reaches the prism portions 51 and a part of the rays of light reaching the prism portions 51 is collected toward the direction of the normal line of the light exit surface 19A. Accordingly, the front luminance of light exiting the light guide plate 19 is further increased.

If the exit light reflection portions 160 are included in the apex portions of the prism portions 51 as is in Comparative Example 1, the light reflected by the exit light reflection portions 160 (that is likely to exit the light guide plate) is likely to be collected by the prism portions 51 (as is illustrated by an arrow L10 in FIG. 13). Therefore, among the rays of light exiting through the light exit surface 19A, light exiting the portions overlapping the exit light reflection portions 160 have luminance higher than surrounding portions thereof and luminance unevenness is caused with respect to the Y-axis direction.

In the present embodiment, the exit light reflection portions 60 are provided in the recessed portion 52 formed by the two adjacent prism portions 51, 51. Therefore, compared to the configuration of Comparative Example 1 (including the exit light reflection portions in the apex portions of the prism portions), light reflected by the exit light reflection portions 60 is less likely to reach the inclined surface 51A of the prism portion 51 and less likely to be collected (as illustrated by an arrow L11 in FIG. 4). As a result, the luminance of the portions overlapping the exit light reflection portions 60 is less likely to be higher than the surrounding portions thereof and the luminance unevenness is less likely to be caused with respect to the Y-axis direction (the arrangement direction of the LEDs 17).

According to the configuration of Comparative Example 2 including the light entrance prisms 180, the light is dispersed in the Y-axis direction and the luminance unevenness is less likely to be caused. However, in the configuration of Comparative Example 2, the luminance of exit light may be lowered. The reasons of lowering of the luminance are as follows. The light is dispersed in the Y-axis direction when passing through the light entrance surface 179B and therefore, light is likely to be incident on a side edge surface 179E of the light guide plate 179 at an angle of incident not greater than the critical angle. Accordingly, the amount of light exiting the light guide plate 179 before reaching a display area of the liquid crystal panel may be increased (as illustrated by an arrow L9 in FIG. 15), or the light is dispersed in the Y-axis direction when passing through the light entrance surface 179B so that the directivity of the light exiting the light guide plate 179 through the light exit surface may be lowered.

Figure 16:
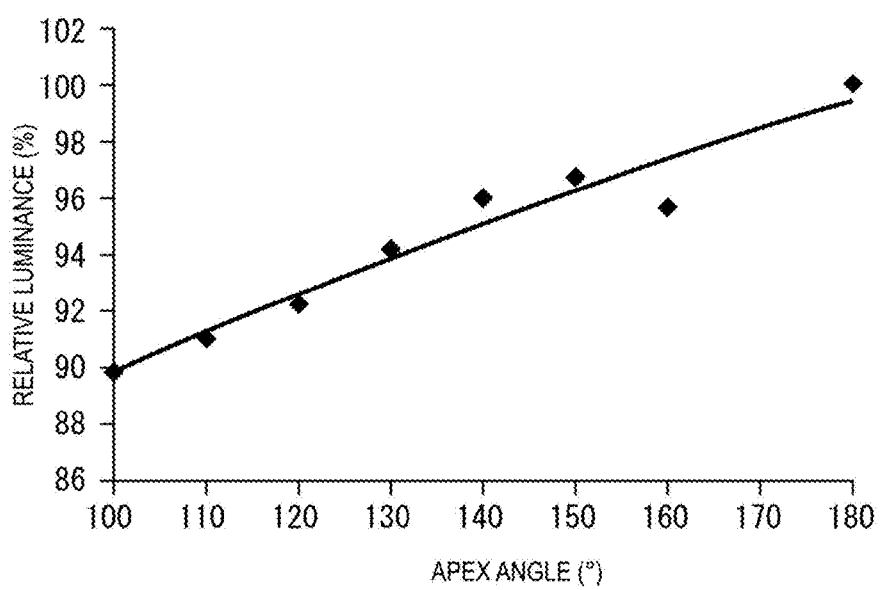
FIG. 16 is a graph illustrating correlation of an apex angle of a light entrance prism and luminance of exit light in Comparative Example 2.

FIG. 16 is a graph illustrating correlation of an apex angle of the light entrance prisms 180 and the luminance of exit light. In FIG. 16, a horizontal axis represents the apex angles of the light entrance prisms 180 and a vertical axis represents relative luminance obtained based on a reference that a luminance value of the exit light with the apex angle of the light entrance prisms 180 being 180° is 100%. In FIG. 16, the luminance is maximum when the apex angle of the light entrance prisms 180 is 180°, and the light is dispersed greatly in the Y-axis direction and the luminance is lowered as the apex angle is decreased.

Next, results of comparing luminance unevenness in the present embodiment, Comparative Example 1, and Comparative Example 2 will be described with reference to FIGS. 8 to 10. FIG. 8 is a table illustrating configurations of the present embodiment, Comparative Example 1, and Comparative Example 2. FIG. 8 also represents evaluation results of luminance unevenness and luminance in each of the configurations. As illustrated in FIG. 8, in each of the present embodiment, Comparative Example 1, and Comparative Example 2, the lens portion 55 has a cylindrical shape and the apex angle of the prism portion 51 is 140°. In Comparative Example 2, the apex angle of the light entrance prism 180 is 110°.

Figure 9:
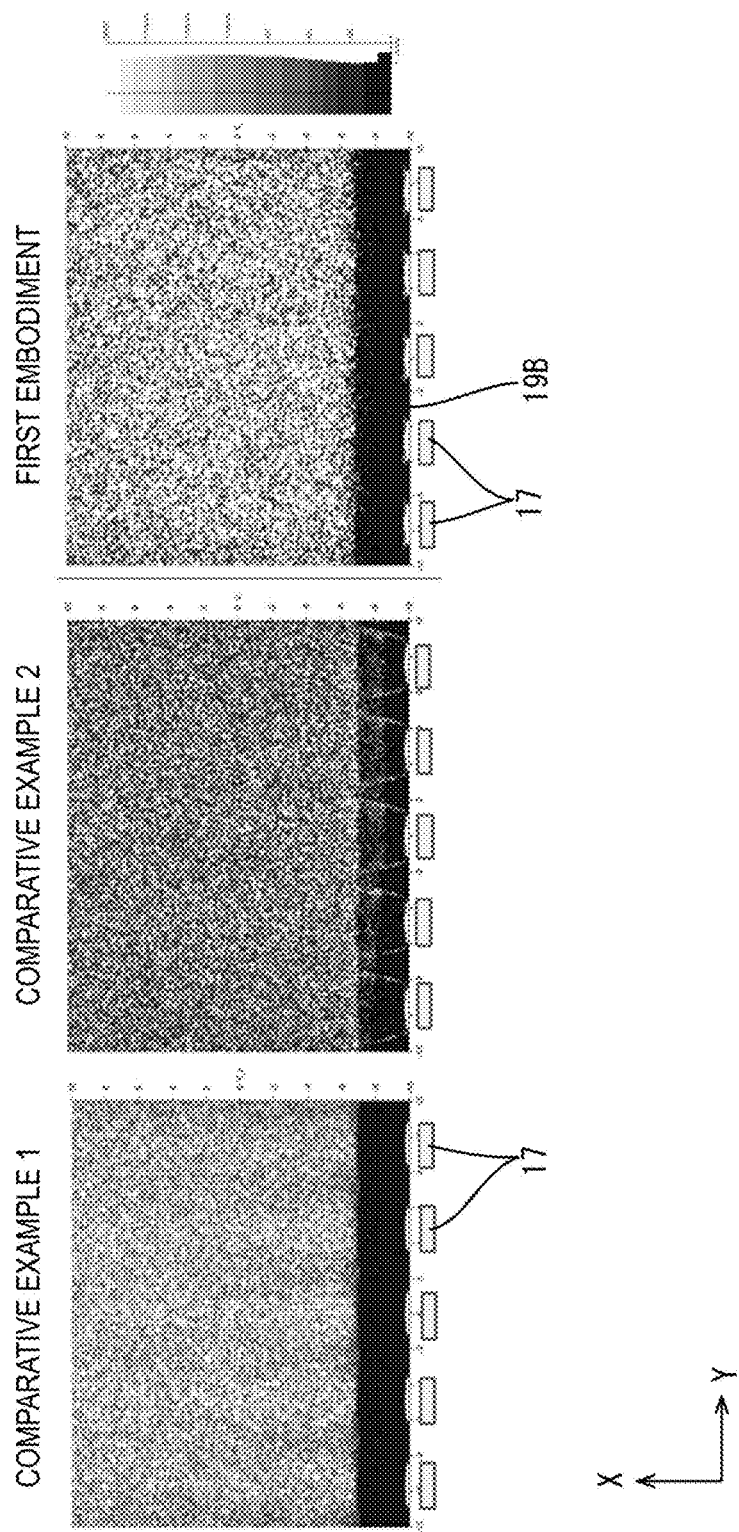
FIG. 9 illustrates images representing a luminance distribution of Comparative Examples 1 and 2 and the first embodiment.

FIG. 9 illustrates images each illustrating a luminance distribution of exit light from the light guide plate. FIG. 9 illustrates the images of edge portions of the light exit surface of the light guide plate near the light entrance surface, and the luminance of the exit light is higher as a color of the image is closer to white. According to FIG. 9, in Comparative Example 1, luminance unevenness is caused with respect to the Y-axis direction in a portion near the LEDs 17. In Comparative Example 2, luminance unevenness is less likely to be caused compared to Comparative Example 1. However, the luminance is lowered. In the present embodiment, the luminance unevenness is less likely to be caused compared to Comparative Example 1 and the luminance is higher than Comparative Example 2. FIG. 8 illustrates average luminance of the values obtained in each of the present embodiment, Comparative Example 1, and Comparative Example 2. In Comparative Example 2, the average luminance is lowered by 10% than that of Comparative Example 1. In the configuration of the present embodiment, the average luminance is slightly higher than that of Comparative Example 1.

Figure 10:
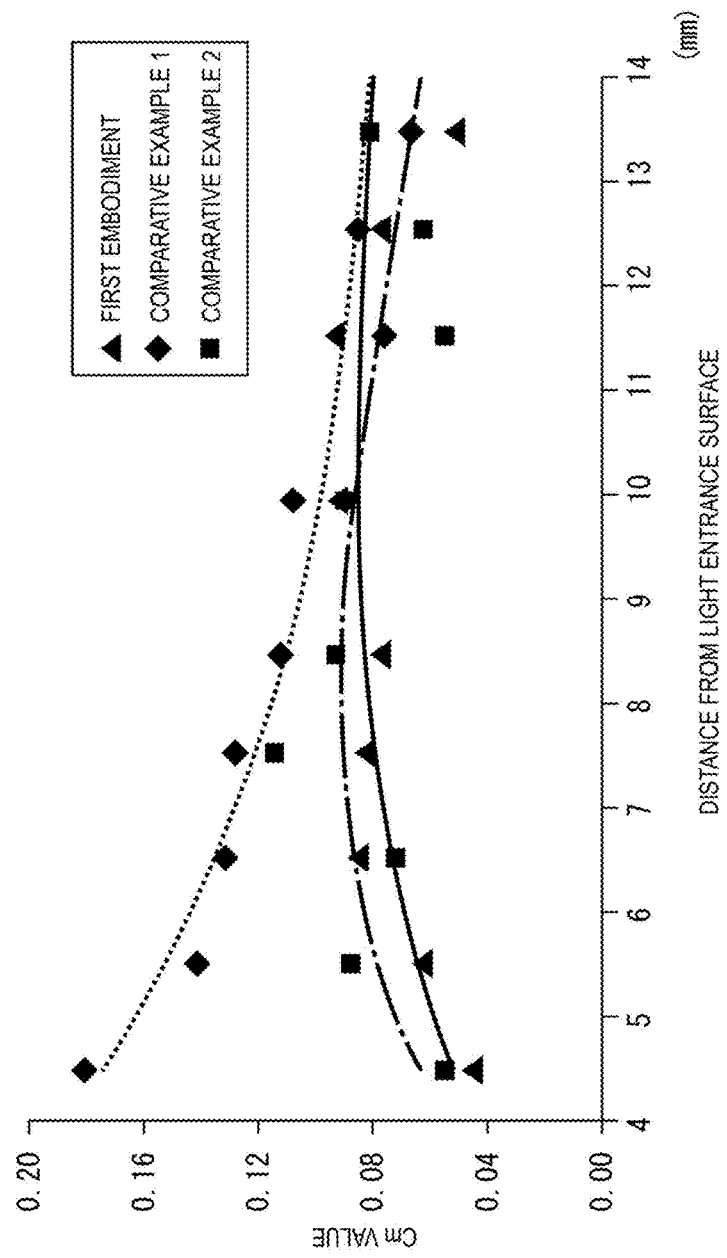
FIG. 10 is a graph representing unevenness of luminance that is quantified according to Comparative Examples 1 and 2 and the first embodiment.

FIG. 10 illustrates graphs representing luminance unevenness that is quantified with using Michelson Contrast in the present embodiment, Comparative Example 1, and Comparative Example 2. In FIG. 10, a horizontal axis represents a distance from the light entrance surface in the X-axis direction. A vertical axis represents a value of Michelson Contrast (Cm value) relating luminance unevenness with respect to the Y-axis direction, and as the value is greater, the luminance unevenness with respect to the Y-axis direction is greater. FIG. 10 illustrates results obtained in the area near the light entrance surface. As illustrated in FIG. 10, in Comparative Example 1, the luminance unevenness is largest and the luminance unevenness is improved as the distance from the light exit surface (the LEDs) is increased. In the present embodiment, luminance unevenness is improved compared to Comparative Example 1 and is similar to that of Comparative Example 2. FIG. 8 illustrates an average Cm value within a range of 4 mm to 14 mm. Accordingly, in the present embodiment, the luminance of the exit light is not lowered and the luminance unevenness is less likely to occur.

The exit light reflection portions 60 are arranged in a direction of the normal line of the light entrance surface 19B (in the X-axis direction) and each of them includes a third inclined surface 63 (a inclined surface) that is inclined toward the light exit surface 19A as is farther away from the LEDs 17. The third inclined surfaces 63 of the exit light reflection portions 60 have greater areas as is farther away from the LEDs 17.

According to such a configuration, a greater amount of rays of light exits the light guide plate 19 as the third inclined surfaces 63 are farther away from the LEDs 17. Generally, the amount of exit light is reduced as a portion of the light guide plate 19 is farther away from the LEDs 17. According to the configuration where each area of the third inclined surfaces 63 is set as described above, luminance unevenness is less likely to occur in the light exiting through the portion of the light exit surface 19A closer to the LEDs 17 and the portion thereof farther away from the LEDs 17. Namely, luminance unevenness is less likely to occur in the exit light exiting the light guide plate 19 with respect to the X-axis direction.

The prism portions 51 extend in a direction perpendicular to the arrangement direction of the prism portions 51. Each of the ridge lines 53 of the adjacent two prism portions extends in the arrangement direction of the exit light reflection portions 60. The distance from the exit light reflection portion 60 to the ridge line 53 with respect to the plate thickness direction (Z-axis direction) of the light guide plate 19 is decreased as the exit light reflection portion 60 is farther away from the LEDs 17.

The exit light reflection portions 60 are formed in the recessed portion 52 between the adjacent two prism portions 51, 51 and therefore, the exit light reflection portions 60 are formed on surfaces of the prism portions 51. The exit light reflection portions 60 are formed to connect the surface of one of the two adjacent prism portions 51 and the surface of the other one. The distance between the surface of the one of the two adjacent prism portions 51 and the surface of the other one of the two adjacent prism portions 51 is increased as is closer to the ridge line 53 of the prism portion 51. Therefore, each of the inclined surfaces (the inclined surfaces 61, 62, 63) included in the exit light reflection portion 60 increases in a length thereof with respect to a direction perpendicular to the ridge line 53 (the Y-axis direction) and increases in an area thereof as is closer to the ridge line 53 of the prism portion 51. As is in the present embodiment, the distance between the exit light reflection portion 60 and the ridge line 53 with respect to the plate thickness direction of the light guide plate 19 is decreased as is farther away from the LEDs 17. Therefore, the third inclined surface 63 is closer to the ridge line 53 as is farther away from the LEDs 17 and the area of the third inclined surfaces 63 is increased.

The light guide plate 19 has a rectangular shape and the light entrance surface 19B has an elongated shape extending in one side direction of the light guide plate 19 (in the Y-axis direction). The LEDs 17 are arranged in the longitudinal direction of the light entrance surface 19B and the prism portions 51 are configured to collect light with respect to the arrangement direction in which the LEDs 17 are arranged. According to such a configuration, luminance unevenness is less likely to be caused with respect to the arrangement direction of the LEDs 17.

Second Embodiment

Figure 17:
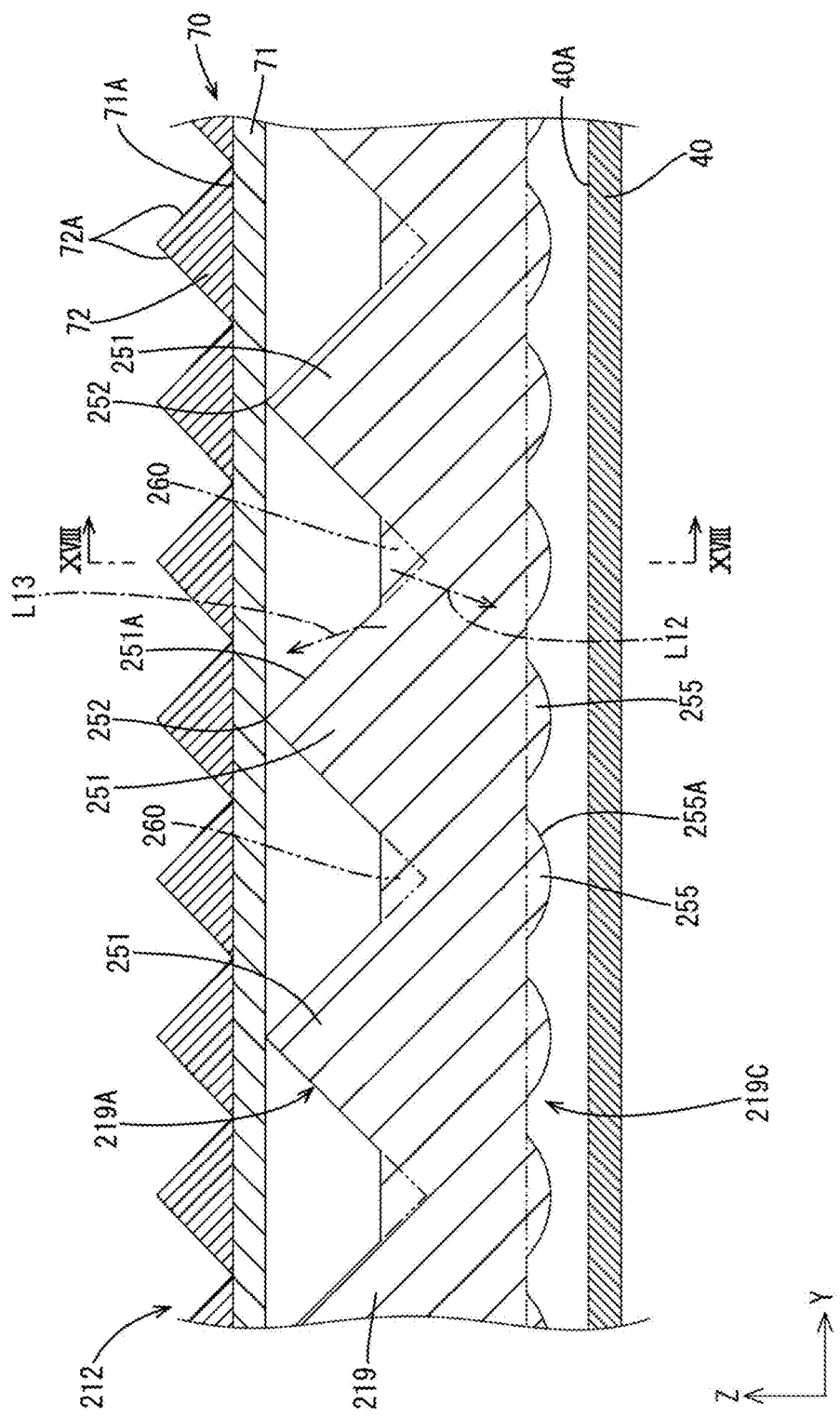
FIG. 17 is a cross-sectional view illustrating a cross-sectional configuration taken in a short-side direction (the Y-axis direction) of a backlight device of a second embodiment.

Next, a second embodiment of the present invention will be described with reference to FIGS. 17 and 18. In a backlight device 212 of the present embodiment, a configuration of a light guide plate differs from that of the above embodiment. The configurations, operations, and effects that are similar to those in the above embodiment will not be described. A light guide plate 219 of the present embodiment includes prism portions 251 on a light exit surface 219A thereof and includes lens portions 255 on an opposite plate surface 219C thereof. As illustrated in FIG. 17, each of the prism portions 251 has a triangular cross-sectional shape and extends in the X-axis direction. The prism portions 251 are arranged in the Y-axis direction. The lens portion 255 is a cylindrical lens having a semicylindrical shape extending in the X-axis direction and the lens portions 255 are arranged in the Y-axis direction. The prism portions 251 (the light collecting portions) and the lens portions 255 are configured to control a degree of dispersing (or collecting) of light with respect to the Y-axis direction.

Apart of the rays of light travelling within the light guide plate 219 that reaches inclined surfaces 251A of the prism portions 251 is retracted or totally reflected by the inclined surfaces 251A and dispersed with respect to the Y-axis direction. For example, light that is incident on the inclined surface 251A at an angle of incident in the Z-axis direction is configured to be retracted and dispersed in the Y-axis direction (as illustrated by an arrow L13 in FIG. 17). According to the angle of incident on the inclined surface 251A, some rays of light may be collected with respect to the Y-axis direction by retraction or total reflection. The light is dispersed with respect to the Y-axis direction by retraction or total reflection by an arched surface 255A of the lens portion 255 similarly to the prism portion 251. According to the angle of incident on the arched surface 255A, some rays of light may be collected with respect to the Y-axis direction by retraction or total reflection.

Figure 18:
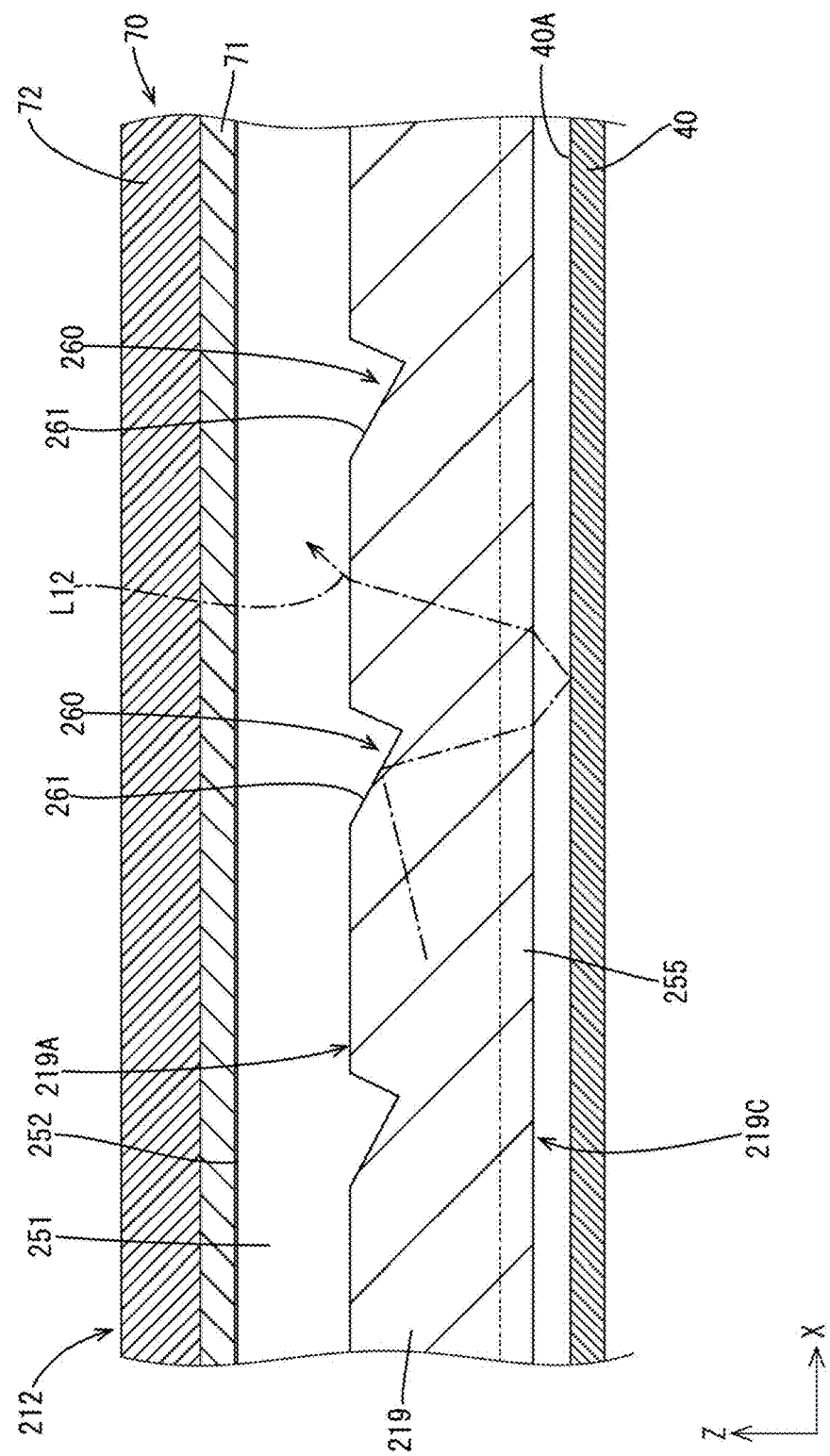
FIG. 18 is a cross-sectional view illustrating a cross-sectional configuration taken in a long-side direction (the X-axis direction) of the backlight device of the second embodiment.

As illustrated in FIG. 18, an exit light reflection portion 260 is formed between the two adjacent prism portions 251, 251. As illustrated in FIG. 18, the exit light reflection portion 260 is formed by cutting off a part of a plate surface of the light guide plate 219 and the exit light reflection portions 260 are arranged in the X-axis direction. The exit light reflection portion 260 has an inclined surface 261 that is inclined to be closer to the opposite plate surface 219C as is farther away from the LEDs 17 (as is closer to the right side in FIG. 18). According to such a configuration, a part of the rays of light travelling within the light guide plate 219 from the LED 17 (the left side in FIG. 18) and reaching the inclined surface 261 is incident on the inclined surface 261 at an angle of incident not less than the critical angle and reflected by the inclined surface 261 toward the opposite plate surface 219C (as illustrated by an arrow L12 in FIG. 18).

The light is reflected by the inclined surface 261 toward in a direction of the Z-axis direction (a direction of the normal line of the plate surface of the light guide plate 219). Accordingly, light reflecting off the inclined surface 261 is incident on the light exit surface 219A and the opposite plate surface 219C at an angle of incident not greater than the critical angle and the light exits the lightguide plate 219. In the present embodiment, the distance between each of the exit light reflection portions 260 and a ridge line 252 of the prism portion 251 with respect to the Z-axis direction is constant. The inclined surfaces 261 may have a greater area as is farther away from the LEDs 17.

The light reflected by the inclined surface 261 toward the opposite plate surface 219C exits through the opposite plate surface 219C. Then, the light exiting through the opposite plate surface 219C is reflected by the light reflection sheet 40 toward the opposite plate surface 219C and enter the light guide plate 219 through the opposite plate surface 219C. The light entering the light guide plate 219 travels toward the light exit surface 219A and exits through the light exit surface 219A.

If the exit light reflection portion 260 is formed on the opposite plate surface 219C and the lens portions 255 are formed on the light exit surface 219A, the light reflected by the exit light reflection portion 260 travels toward the light exit surface 219A and passes through the lens portions 255 only once and exits through the light exit surface 219A. Compared to such a configuration, in the present embodiment, the light exiting through the opposite plate surface 219C is reflected by the light reflection sheet 40 and enters the light guide plate 219 through the opposite plate surface 219C. During this process, the light passes through the lens portions 255 (a light dispersing portion) twice and passes through the prism portions 251 once. In the present embodiment, the light passes through the light dispersing portion that applies a light dispersing action (the lens portions 255 or the prism portions 251) at least three times. Thus, the light is surely dispersed with respect to the Y-axis direction and luminance unevenness is further less likely to be caused.

In the present embodiment, most of the rays of light exiting through the light exit surface 219A travel through the light reflection sheet 40. Therefore, the light reflection sheet preferably is configured to mirror reflect the light.

According to such a configuration, dispersing reflection by the light reflection sheet 40 is less likely to be caused and the exit light exiting through the light exit surface 219A has high front luminance. Such a light reflection sheet 40 may be formed by providing a metal thin film (such as silver thin film) on a surface of a film substrate of synthetic resin with vapor deposition.

Third Embodiment

Figure 19:
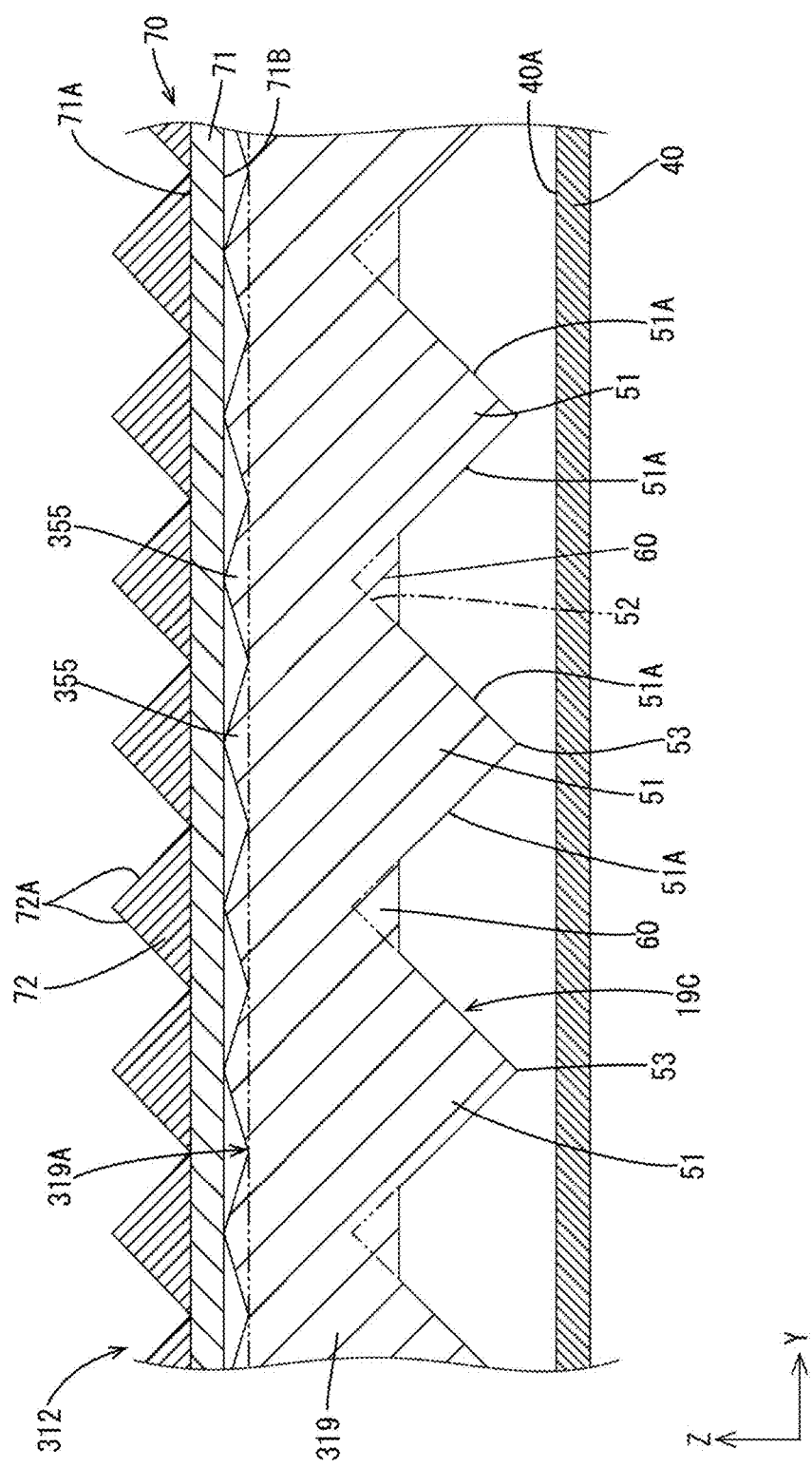
FIG. 19 is a cross-sectional view illustrating a cross-sectional configuration taken in a short-side direction (the Y-axis direction) of a backlight device of a third embodiment.

Next, a third embodiment of the present invention will be described with reference to FIGS. 19 and 20. In a backlight device 312 of the present embodiment, a configuration of a light guide plate differs from that of the above embodiment. The configurations, operations, and effects that are similar to those in the above embodiment will not be described. As illustrated in FIG. 19, a light guide plate 319 of the present embodiment includes prism portions 355 on a light exit surface 319A and the prism portions 355 are arranged in the Y-axis direction. Each of the prism portions 355 has a triangular cross-sectional shape and extends in the X-axis direction. A degree of collecting light exiting through the light exit surface 319A or luminance of the exit light is controlled by changing an apex angle of each prism portion 355. FIG. 20 illustrates a table representing results of changes in luminance of the exit light exiting through the light exit surface 19A when the apex angle of the prism portions 355 and the prism portions 51 are changed. In FIG. 20, relative luminance is a relative value obtained based on a reference that a luminance value of the exit light in the configuration of the first embodiment is 100%. According to the results in FIG. 20, the luminance is increased by 3% or more than that of the first embodiment if the apex angle of the prism portions 355 and the prism portions 51 is from 100° to 150°.

Other Embodiments

The present invention is not limited to the embodiments, which have been described using the foregoing descriptions and the drawings. For example, embodiments described below are also included in the technical scope of the present invention.

Figure 21:
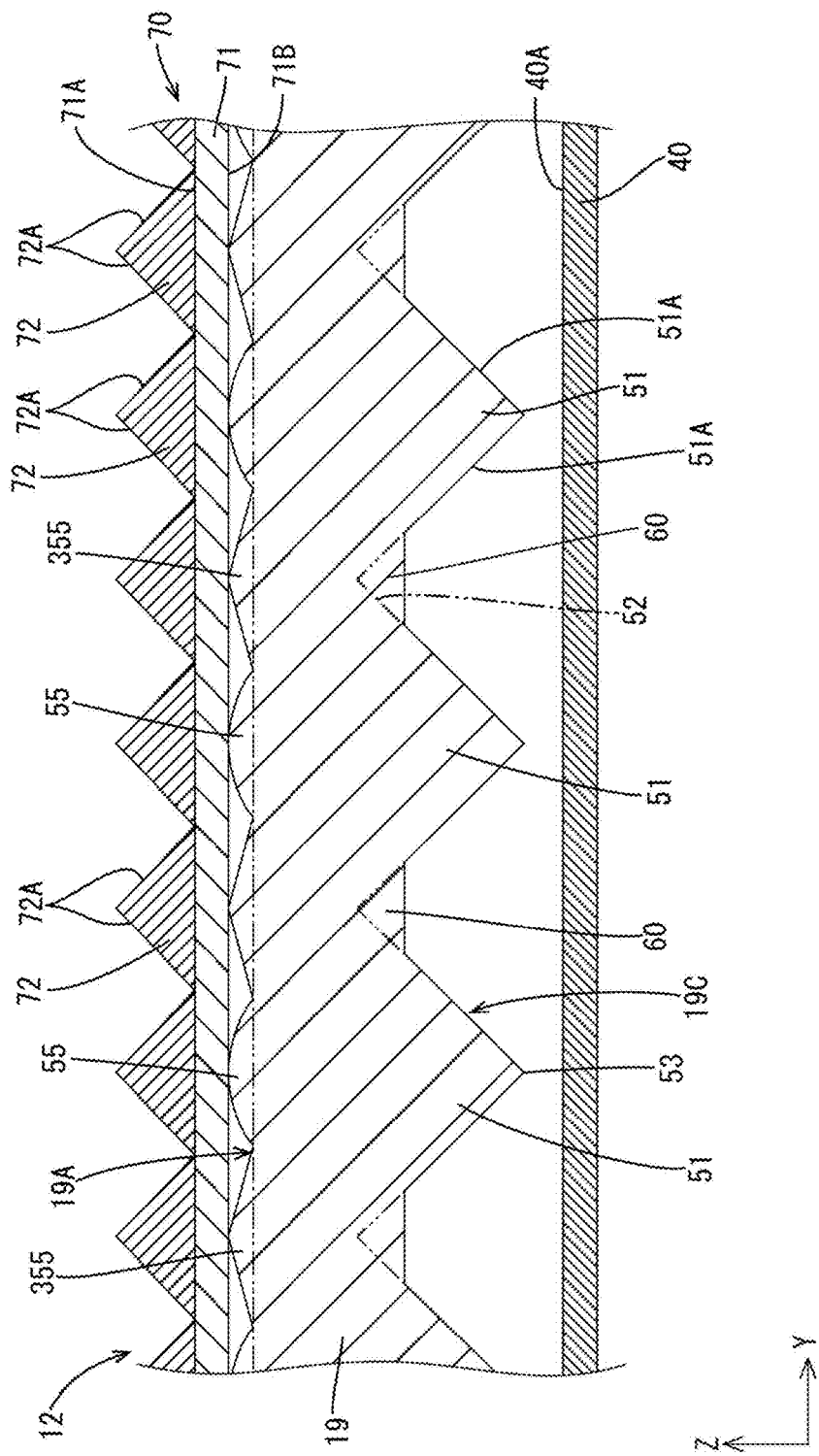
FIG. 21 is a cross-sectional view illustrating a light guide plate of a first modification.
Figure 22:
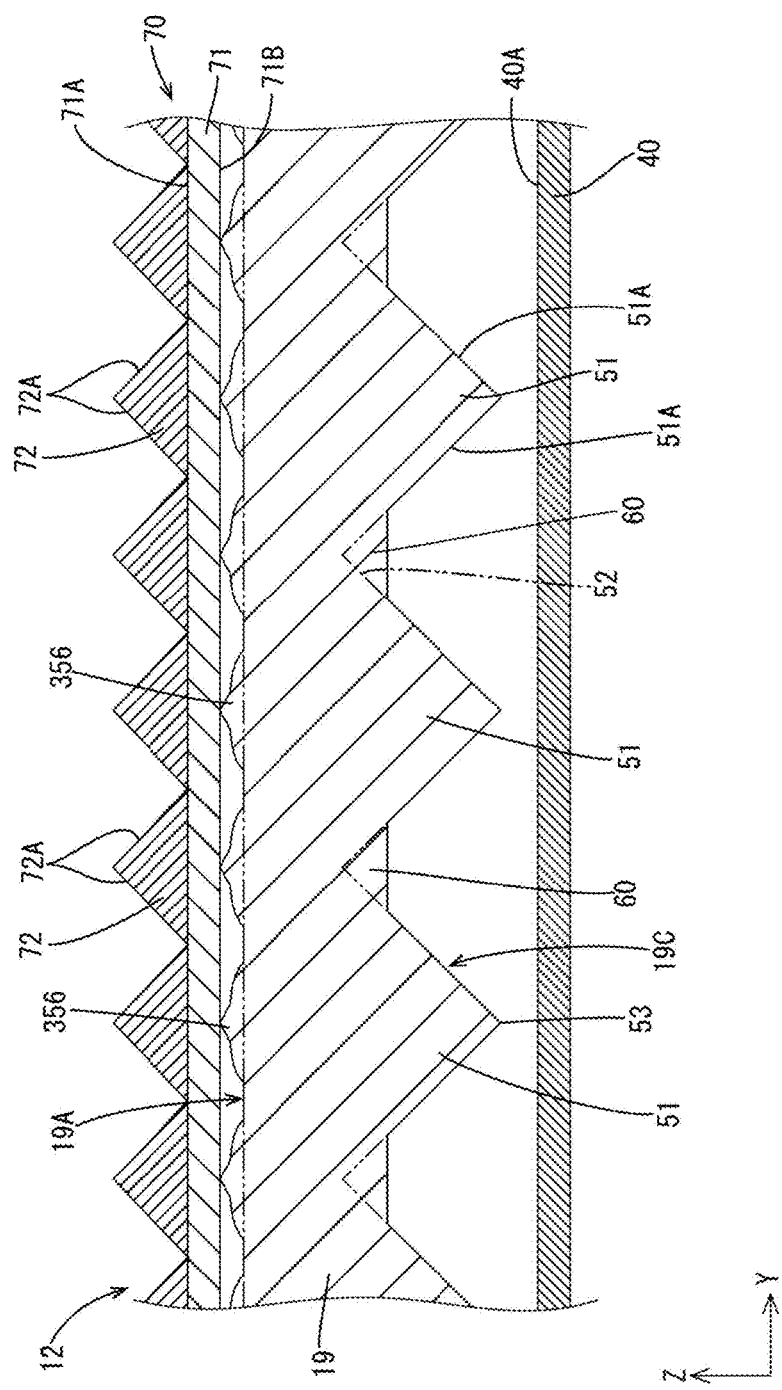
FIG. 22 is a cross-sectional view illustrating a light guide plate of a second modification.

(1) The lens portions 55 are provided on the light exit surface of the light guide plate in the first embodiment, and the prism portions 355 are provided on the light exit surface of the light guide plate in the third embodiment. However, the configuration is not limited thereto. As illustrated in FIG. 21, the lens portions 55 and the prism portions 355 may be provided alternately in the Y-axis direction on the light exit surface 19A. As illustrated in FIG. 22, projections 356 each of which has a shape of combination of the shapes of the lens and the prism may be integrally formed with the light exit surface 19A. As illustrated in FIGS. 21 and 22, with the configuration including the lens and the prism, the light travels within the light guide plate 19 in more complicate ways and the luminance unevenness is further less likely to be caused in the exit light from the light guide plate 19.

(2) In the first embodiment, among the exit light reflection portions 60, the exit light reflection portion is closer to the ridge line 53 as is farther away from the LEDs 17. However, it is not limited thereto. The distance between each of the exit light reflection portions 60 and the ridge line 53 may be constant.

(3) In the above embodiments, the prism portions are included as the light collection portions and the exit light reflection portions are provided in the recessed portion formed by the two prism portions. However, it is not limited thereto. For example, the light collection portions may be lens portions and the exit light reflection portions may be provided in a recessed portion formed by two adjacent lens portions.

(4) In the above embodiments, the prism sheet including the prism portions is used as the light collection sheet and it is not limited thereto. For example, the collection sheet may include cylindrical lenses.

(5) In each of the above embodiments, the LEDs are used as the light source. However, other light sources such as organic EL may be used.

(6) In each of the above embodiments, the TFTs are used as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

(7) In each of the above embodiments, the liquid crystal display device including the liquid crystal panel as the display panel is used. The present invention may be applied to display devices including other type of display panel.

EXPLANATION OF SYMBOLS

10: liquid crystal display device (display device), 11: liquid crystal panel (display panel), 12, 212, 312: backlight device (lighting device), 17: LED (light source), 19: light guide plate, 19A: light exit surface, 19B: light entrance surface, 19C: opposite plate surface, 40: light reflection sheet (light reflecting member), 51, 251: prism portion (light collecting portion), 52: recessed portion, 53: ridge line (ridge line of the light collecting portion), 60, 260: exit light reflection portion, 63: third inclined surface (inclined surface), 255: lens portion (light dispersing portion), 261: inclined surface, Z1, Z2: distance to the ridge line in a plate thickness direction of the light guide plate.

The invention claimed is:

1. A lighting device comprising:
light sources; and
a light guide plate including an edge surface and a pair of plate surfaces, a part of the edge surface being a light entrance surface through which light from the light sources enters, and one of the pair of plate surfaces being a light exit surface through which the light exits and another one of the pair of plate surfaces being an opposite plate surface opposite from the light exit surface, wherein
the light guide plate includes
light collecting portions on the opposite plate surface, projecting from the one of the light exit surface and the opposite plate surface and arranged in a predetermined direction and configured to collect light toward a normal direction of the light exit surface, and
an exit light reflection portion provided in a recessed portion that is formed by two adjacent light collecting portions and configured to reflect light travelling within the light guide plate and facilitate exiting of light from the light guide plate,
the exit light reflection portion includes multiple unit exit light reflection portions that are arranged in a normal line of the light entrance surface,
each of the multiple unit exit light reflection portions has a first inclined surface, a second inclined surface, and a third inclined surface that are arranged in this order from a closest one to the light source and have different inclination angles with respect to the opposite plate surface,
the first inclined surface and the second inclined surface are inclined to be closer to the opposite plate surface as is farther away from the light source, and the second inclined surface has an inclination angle with respect to the opposite plate surface that is smaller than an inclination angle of the first inclined surface,
the third inclined surface is inclined toward the light exit surface as it extends farther away from the light sources, and
each of the first inclined surface, the second inclined surface, and the third inclined surface has a greater area as it is farther away from the light sources.

2. The lighting device according to claim 1, wherein
the light collecting portions are first prism portions that extend in a direction perpendicular to an arrangement direction in which the light collecting portions are arranged,
the two adjacent light collecting portions have ridge lines each of which extends in an arrangement direction in which the exit light reflection portions are arranged, and
the multiple unit exit light reflection portions are formed such that a distance between each of the multiple unit exit light reflection portions and the ridge lines with respect to a plate thickness direction of the light guide plate is decreased as each of the multiple unit exit light reflection portions is farther away from the light sources.

3. The lighting device according to claim 1, further comprising a light reflecting member arranged to cover the opposite plate surface and configured to reflect light toward the opposite plate surface, wherein the light guide plate includes the light collecting portions and the exit light reflection portions on the light exit surface, and
the light guide plate includes a light dispersing portion on the opposite plate surface, the light dispersing portion dispersing light.

4. The lighting device according to claim 1, wherein
the light guide plate has a rectangular shape and the light entrance surface has an elongated shape extending in one side direction of the light guide plate,
the light sources are arranged in a longitudinal direction of the light entrance surface, and
the light collecting portions are configured to collect light with respect to an arrangement direction in which the light sources are arranged.

5. A display device comprising:
the lighting device according to claim 1; and
a display panel displaying images using light from the lighting device.

6. The display device according to claim 5, wherein the display panel is a liquid crystal panel including a pair of substrates and liquid crystals enclosed between the substrates.

7. The lighting device according to claim 1, wherein
the light collecting portions are first prism portions that extend in a direction perpendicular to an arrangement direction in which the light collecting portions are arranged,
the two adjacent light collecting portions have ridge lines each of which extends in an arrangement direction in which the exit light reflection portions are arranged, and
the multiple unit exit light reflection portions are formed such that a distance from a cross line between the second inclined surface and the third inclined surface to each of the ridge lines with respect to a plate thickness direction of the light guide plate is decreased as each of the multiple unit exit light reflection portions is farther away from the light sources.

8. The lighting device according to claim 1, wherein the first inclined surface has an area smaller than an area of the second inclined surface and an area of the third inclined surface.

9. The lighting device according to claim 1, wherein
the light collecting portions are first prism portions that extend in a perpendicular direction perpendicular to an arrangement direction in which the light collecting portions are arranged,
the light guide plate further includes second prism portions on the light exit surface and the second prism portions extend in a direction of the normal line and arranged in a direction perpendicular to the direction of the normal line, and
each of the first prism portions has a triangular cross-sectional shape taken along the direction perpendicular to the direction of the normal line, and each of the second prism portions has a triangular cross-sectional shape taken along the direction perpendicular to the direction of the normal line, and the triangular cross-sectional shape of the first prism portions and the second prism portions has an apex angle from 100° to 150°.

* * * * *